United States Patent
Atkinson et al.

(10) Patent No.: US 12,026,265 B2
(45) Date of Patent: Jul. 2, 2024

(54) AGENTS AND SYSTEMS FOR RIGHT'S MANAGEMENT

(71) Applicants: Paul Atkinson, Poway, CA (US); Jack Donner, San Diego, CA (US)

(72) Inventors: Paul Atkinson, Poway, CA (US); Jack Donner, San Diego, CA (US)

(*) Notice: Subject to any disclaimer, the term of this patent is extended or adjusted under 35 U.S.C. 154(b) by 749 days.

(21) Appl. No.: 17/067,655

(22) Filed: Oct. 10, 2020

(65) Prior Publication Data

US 2022/0114266 A1 Apr. 14, 2022

(51) Int. Cl.
| | |
|---|---|
| G06F 21/60 | (2013.01) |
| G01D 21/02 | (2006.01) |
| G06F 16/27 | (2019.01) |
| G06F 21/64 | (2013.01) |
| G06Q 10/10 | (2023.01) |
| G06Q 20/12 | (2012.01) |
| G06Q 20/40 | (2012.01) |
| G06Q 30/018 | (2023.01) |
| G06Q 50/18 | (2012.01) |
| G06Q 10/08 | (2023.01) |
| G06Q 40/08 | (2012.01) |
| G06Q 50/26 | (2012.01) |
| G08B 3/10 | (2006.01) |
| G08B 5/22 | (2006.01) |

(52) U.S. Cl.
CPC ........... *G06F 21/604* (2013.01); *G01D 21/02* (2013.01); *G06F 16/27* (2019.01); *G06F 21/64* (2013.01); *G06Q 10/10* (2013.01); *G06Q 20/1235* (2013.01); *G06Q 20/405* (2013.01); *G06Q 30/0185* (2013.01); *G06Q 50/18* (2013.01); *G06F 2221/2141* (2013.01); *G06Q 10/08* (2013.01); *G06Q 40/08* (2013.01); *G06Q 50/26* (2013.01); *G08B 3/10* (2013.01); *G08B 5/22* (2013.01)

(58) Field of Classification Search
CPC ........ G06F 21/604; G06F 16/27; G06F 21/64; G06F 2221/2141; G06Q 10/10; G06Q 20/405; G06Q 20/1235; G06Q 30/0185; G06Q 40/08; G06Q 50/26; G06Q 50/28; G08B 3/10; G08B 5/22
See application file for complete search history.

(56) References Cited

U.S. PATENT DOCUMENTS

| | | | | |
|---|---|---|---|---|
| 10,853,902 | B2 * | 12/2020 | Atkinson | H04L 9/0637 |
| 11,205,172 | B2 * | 12/2021 | Snow | G06Q 20/367 |
| 11,394,547 | B2 * | 7/2022 | Donner | G06K 19/0723 |
| 11,676,132 | B2 * | 6/2023 | Snow | G06Q 20/065 |
| | | | | 713/168 |
| 11,687,916 | B2 * | 6/2023 | Snow | G06Q 20/0658 |
| | | | | 705/65 |

* cited by examiner

*Primary Examiner* — Hosuk Song

(57) ABSTRACT

An information system is provided that enables stakeholders to define a secure data object that sets permissions, rules, and rights for an asset. The secure data object may be communicated to entities, such as computer hosts or hardware agents, and the entities are enable to act within the permissions, rules, and rights to conduct transactions and gather information as agents of the stakeholders. The secure data object may be received into a hardware agent attached to an asset, and the agent may have sufficient permission to monitor environmental conditions, adjust pricing, consummate a transaction, or communicate a report.

24 Claims, 19 Drawing Sheets

Figure 1 – Exemplary Hardware Agent

Figure 1 – Exemplary Hardware Agent

Exemplary Trust Set

AGENTS AND SYSTEMS FOR RIGHT'S MANAGEMENT

RELATED APPLICATIONS

This application is continuation to U.S. patent application Ser. No. 15/602,885, filed May 23, 2017, which is a continuation-in-part to U.S. patent application Ser. No. 15/228,270, filed Aug. 4, 2016 and entitled "Transaction Agents and Systems," which claims priority to U.S. provisional patent application No. 62/354,491, filed Jun. 24, 2016 and entitled "CHR-038 Agents," and to U.S. provisional patent application No. 62/358,685, filed Jul. 6, 2016 and entitled "Agent Transaction Systems," all both of which are incorporated herein in their entirety.

FIELD OF THE INVENTION

The present invention relates to an intelligent hardware agent that is particularly constructed to be associated with a good, and to enable trusted and verifiable transactions for that good. In one aspect, the hardware agent's electronics facilitates local decision-making to effect transaction decisions with limited or even no wide-area communication.

BACKGROUND

Modern commerce is increasingly dependent on transporting goods using carriers as society embraces more and more online shopping. For example, modern consumers are increasingly using online shopping and common carriers for delivering wine, prescription medication, food, and sensitive electronic devices. To assist in tracking and monitoring the movement of sensitive and expensive goods, labels have been developed in the past that incorporate RFID communication and intelligence. In this way, at the point of shipment and throughout the delivery flow, the good has the ability to be tracked. However, adoption of such RFID labels has been slow, as the equipment for initializing, loading, updating, and interrogating the label's RFID electronics is expensive, and typically only available at larger transfer points in the shipping transaction. Further, it is unlikely, and even rare, for the end consumer to be able to interact with the label. Since the consumer is a critical part of the delivery chain, and the consumer is excluded from participation in the information available on the label, the use of intelligent labels has been quite low and very ineffective in improving the customer experience.

Intelligent labels, packaging, tags, windshield stickers, stand-alone displays and other devices, collectively referred to herein as "intelligent labels," benefit from electro-optic devices that display messages that alert, update and inform the persons or machines proximate to them, as fully set forth in co-pending patent application Ser. No. 14/479,055, filed Sep. 5, 2014, and entitled "An Intelligent Label Device and Method," which is incorporated herein in its entirety. This earlier application describes an intelligent label that can be attached to any good, and then is used to provide a visual indicator to a human or machine on some condition or event in that distribution path. Of particular interest therefore are bistable and permanently irreversible electro-optic displays and intelligent labels that comprise them.

In one example of using the intelligent label, if a good is subjected to an extreme temperature or to vibration shock, then a visual indicator may be set such that a human or a machine will understand that the good is no longer of acceptable commercial quality. Of course, it will be appreciated that machines can perceive information outside of the normal human optical range. Messages for the intelligent label are visually perceptible forms of data, information, content, text, patterns, images, shapes, symbols, codes, and colors, for example. It is important to note that these are visual systems and the messages may change one or more times over the life of the intelligent label. Further the power source that drives them may be limited or intermittent or susceptible to accidental or intentional disruption. Other components of the intelligent label may also fail or be subject to tampering. In this way, the message that is intended by the local electronics to be displayed on the intelligent label may not actually be what the user or machine perceives. Accordingly, in some applications the utility and value of intelligent labels may depend on the confidence with which the messages can be relied upon to make decisions and take actions, and further, that the actual messages perceptible at the time those decisions were made or could or should have been made, and actions were taken or could or should have been taken can be reliably and securely verified.

Although the information provided by such an intelligent label is useful for facilitating transactions, completing transactions still relies on network or backend transactional systems and substantial post transaction involvement from the stakeholders. In almost every commercial transaction there are numerous stakeholders. A stakeholder is a person or entity that has at any point in a transaction an interest in that transaction's outcome. For example, a stakeholder may be the original manufacturer, a company that warehouses the good, one or more shipping companies, a bank that finances the transaction, and the end-user. Although an intelligent label may be able to facilitate the necessary information flow, it requires a substantial network transaction system to allow all of the stakeholders to participate. This need for a standard end-to-end and transaction support system creates barriers to the acceptance of such an intelligent label system.

Accordingly, there is a need to enable stakeholders in transactions involving a good to more easily and efficiently allow a good to enter the chain of commerce, ensure proper handling by all stakeholders, and effect final financial and title transfers. Importantly, these transactions need to be made in a secure, trustworthy, and verifiable environment for all parties involved.

SUMMARY OF THE INVENTION

An intelligent hardware agent ("hardware agent") is a hardware device attached to, embedded in, or otherwise associated with a good. In particular, the hardware agent is bound to the good in such a way that information held by the hardware agent may be confidently associated with the good. The hardware agent is constructed to securely hold information regarding the good, and information about stakeholders, such that the hardware agent may be authorized by stakeholders to autonomously make trusted decisions regarding the good, including for example pricing, sales, title and financial transactions. Although the hardware agent may perform many functions autonomously, it often will have communication capabilities enabling it to share information with stakeholders, or to others as allowed.

In one particular example, the hardware agent is a tag that is bound to a good, and the hardware agent has predefined stakeholders that are authorized to receive, ship, take title to that good, or make changes and decisions about the good's distribution. The hardware agent also includes predefined functions regarding the good. These functions, or primitives, provide rules and agreed upon conditions for managing the good through the distribution chain. These primitives are immutable, that is unchangeable, from the perspective of the stakeholders. In this way, the identity of the stakeholders is trustworthy and verifiable, and the actions that the hardware agent is able to take on their behalf are also trustworthy, verifiable, and unchangeable. In one construction the hardware agent has a registry that maintains a list of those entities authorized to share information with the hardware agent. If the identity of all the stakeholders are known at the time the hardware agent is populated, the registry may be constructed as a permanent read-only memory. In some cases, however, the registry may need at least a portion that can be securely updated at a later time by one of the authorized stakeholders to add, modify, or delete a stakeholder. Along with the immutable primitives described above the hardware agent also contains contracts or rules that set the actions stakeholders are allowed to take, and may monitor that the good is transported properly among various stakeholders. In some cases, the hardware agent may also interact with an escrow or trustee to facilitate conducting final transactions. The hardware agent's contract is hardware secured in such a way that it can only be modified or accessed by authorized stakeholders. The summation of contracts and immutable primitives represent the entire specification as documented in the legal agreement between the stakeholders. In one example, the contract can be set in a read only memory at the time the hardware agent is populated. For further security, a checksum or hashing algorithm may be used to assure that no intervening entity has modified the contract. It will be appreciated that other hardware and system-level processes exist for authenticating read-only memory content.

Advantageously, the hardware agent enables a new class of trusted and verifiable transactions, and provides a full and accurate record of the good's interactions throughout the distribution chain. In particular, such transactions may be effected with either no or only limited network processing or communication.

A hardware agent may be embedded in a tag, label, packaging or otherwise associated with a good to autonomously generate immediately actionable information, independently take actions and organically enable transactions. In this way, the hardware agent enables a new level of trust, accountability, manageability and verifiability to product transactions.

Many hardware agents will use increasingly sophisticated sensors to monitor their environments, manage or drive external devices (e.g. MEMS switches, sensors) and apply authentication or verification technologies. Most hardware agents will wirelessly communicate as well. However unlike known RFID tags and Bluetooth smart labels that are focused on collecting, storing and transmitting raw data for remote conversion into useful information, hardware agents will locally convert data directly into information that users (or other autonomous systems) can immediately act upon.

Hardware agents may also use visual displays—the universal human interface to information, and in many cases, the most efficient path to direct user or consumer actions. Display technologies set out in co-pending U.S. patent application Ser. No. 14/927,098, 62/263,053 and 62/341,768 are incorporated herein in their entirety. By incorporating such display technology, hardware agents, and systems in which they operate, will be able to independently determine, interpret and verify visible information (messages) and in doing so bring further trust to end-to-end solutions with less reliance on network or backend transaction systems. Such visual indicators are a way to reduce barriers to adoption that the RFID tag communities have struggled to overcome. Hardware agents may also incorporate audible technology to receive and generate, and be able to independently determine, interpret and verify, audible information (messages).

Although hardware agents may be constructed to conduct transactions with no or limited network communications, hardware agents utilizing transactional technology may enable more sophisticated transactions unique to a hardware agent and good (e.g. dynamically adjust pricing in response to changes in the condition of a good, issue title, insurance, or payment in response to changes in custody etc.). Of particular interest are chain-of-custody applications, although it should be understood that the systems and methods described herein are applicable to other applications as well. An additional corollary to the above driver is that stakeholders won't have to trust other parties involved, including a centralized service or authority, as trust and verification are provided by the hardware agent itself.

In a typical chain-of-custody application, a hardware agent builds and stores a set of blocks or "data containers" of information that correspond to the 'custodies' of the hardware agent along the way. These data containers may include custodian information, monitored data, changes in condition or utility of the good, elapsed time, events and event times, authorizations, verifications and other information either generated, sensed, or received by the hardware agent. Together these data containers form an electronic "trust" that contains the information each stakeholder (e.g. custodian, owner, or financer) needs to conduct or participate in a transaction with regard to the good to which the hardware agent is associated or bound. Importantly, conducting the transaction may not require knowledge of the actual custodians or of the particular chain-of-custody. Nor does it always require real-time access to the cloud, industry-wide adoption or costly infrastructure. Instead, the trust set within the hardware agent itself, which is physically attached or associated with the good, provides sufficient verification and trust to effect the transaction.

In its simplest form, an agreement's business rules are developed and implemented separate from the contract and hardware agent's trust set. This approach allows for scalable ad-hoc as well as organic adoption and growth. The hardware agent may for example generate a trust set including adjusted prices in response to changes in monitored conditions and custodial participation, that are used by the stakeholders to update invoices and payment in an existing system.

Together, hardware agents and hardware agent-based transaction systems work together in a way that generates trust independent of the parties involved and thus enable a wide range of transaction types including, but not limited to:
  authorizing payment, purchases, title transfer;
  issuing credits, refunds, rebates, returns, replacements;
  customer relationship management, value-pricing, customer assurance;
  financing inventory, receivables; managing assets;
  underwriting insurance, processing claims; managing risk and liability;
  healthcare and government compliance;
  chain-of-custody tracking, channel management, loss prevention; and
  retail performance, promotion monitoring, settlement, and consignment sales.

In another example, an information system is provided that enables stakeholders to define a secure data object that sets permissions, rules, and rights for an asset. The secure data object may be communicated to entities, such as computer hosts or hardware agents, and the entities are enable to act within the permissions, rules, and rights to conduct transactions and gather information as agents of the stakeholders. The secure data object may be received into a hardware agent attached to an asset, and the agent may have sufficient permission to monitor environmental conditions, adjust pricing, consummate a transaction, or communicate a report.

DETAILED DESCRIPTION

Figure 1:
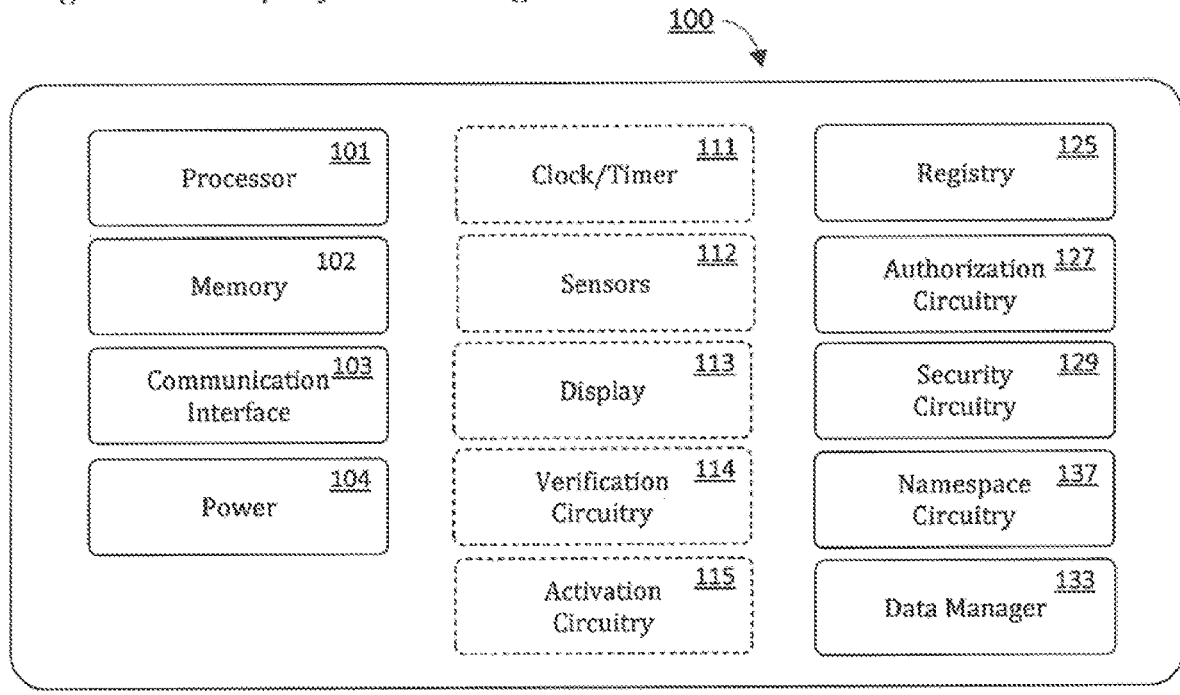
FIG. 1 is a block diagram of a hardware agent in accordance with the present invention.

Commercial transactions to sell a product, or good, usually involve multiple smaller transactions. For example, a manufacturer may make a good, and then use a shipper to stock the good in a distributor's warehouse. A customer may order the good, and then the distributor uses another shipper to get the good to the customer. For some commercial transactions, there may be a financing or insurance company that has a financial interest in the good or the overall transaction. Each party with an interest in the good or transaction, whom herein are referred to as stakeholders, each need to have confidence that the transaction is done according to agreed upon terms governing the transaction A hardware agent is constructed in ways to enable trusted, verifiable, and efficient transactions among multiple stakeholders, and to do so using simple local communication between the hardware agent and a particular stakeholder. Of course, additional functionality may be allowed as wide-area communication is used, but the core transaction does not require it.

In a transaction for most goods, there is an agreement between a buyer and a seller, and often several separate agreements between or among other stakeholders to the good. For the agreements that are known a priori, that is before the good first enters the field of commerce, those agreements can have the essential terms distilled into one or more electronic contracts that set each stakeholders rights and obligations. The contracts are then stored in the hardware agent, thus enabling the hardware agent to consummate a transaction with a stakeholder in compliance with an agreed-upon agreement.

In one implementation, the hardware agent has a set of permanent and unchangeable (immutable) functions that are common to all hardware agents within a class hardware agents. These functions, executed in silicon or firmware primitives, would include commonly used process assets, such as authentication, encryption, and password processing, and could be used by the electronic contract to efficiently and securely consummate a transaction. For further security and efficiency, some, if not all, of the electronic contract could be immutably set into the hardware agent.

To confirm that the contract set in the hardware agent is the one agreed to by the stakeholders, an appropriate certificate authority (e.g. generator of the contract, data warehouse, mutually agreed upon stakeholder etc.) generates and stores a checksum, hash or certificate for the contract. (1) When the contract is set in the hardware agent, the hardware agent generates an immutable checksum, hash or certificate for the contract using immutable certification circuitry (primitive) separate from the contract. The hardware agent then stores the checksum, hash or certificate in one or more of data containers. The hardware agent subsequently secures (encrypts) and communicates the data containers to stakeholders. (2) Upon receipt of their respective data containers, stakeholders compare their original checksum, hash or certificate against the one in the data container from the hardware agent.

Alternatively, the stakeholders may have mutually agreed upon contract and a checksum, hash or certificate generated using a mutually agreed upon algorithm. The hardware agent follows step 1 (above) and the stakeholder step 2 (above).

To certify the data containers in the hardware agent, the hardware agent can use immutable certification circuitry to generate a checksum, hash or certificate for each data container immediately prior to the data container being encrypted. The hardware agent then pairs each checksum, hash or certificate with the appropriate data container ID (optionally anonymous), stores the pairs in one or more data container (advantageously all of them), and them encrypts the data containers. The encrypted data containers are distributed to the stakeholders. The stakeholders decrypt their respective containers and compare the check-sum/hash codes to verify the integrity of the data containers. A data warehouse of other trustee would facilitate the comparison.

Hardware agents may be attached to, embedded in, or otherwise physically associated with items, goods or 'things', and can be thought of as acting on behalf of the stakeholders to effect transactions. Hardware agents are intelligent, communicable and in some cases may operate autonomously. Advantageously, hardware agents locally convert raw data or events into actionable information or transactions that may enable actions by users (e.g. via visual or audible output, or wireless signals) and transactions. Hardware agents are tangible (e.g. comprised of one or more ICs) and usually embedded within tags, labels, smart cards, packaging, or products, for example.

An exemplary hardware agent 100 is shown in FIG. 1. Hardware agents have a processor 101 and memory 102, and one or more communication interfaces 103, at least one of which is typically local area wireless (e.g. RF, optical or acoustic). In one example, the optical wireless interface may be provided as infrared communication link. Hardware agents also have an internal power source 104 (e.g. a battery or charged capacitor) or are externally coupled to a power source (e.g. harvested (RF, optical, radiated etc.).

Hardware agents may have clock/timers 111, sensors 112 and displays 113. Hardware agents may also have visual or audible verification (determination and interpretation) circuitry 114 (including related technologies) such as that described in U.S. patent application Ser. No. 14/927,098, 62/263,053 and 62/341,768. Hardware agents may also have activation circuitry 115 such as electromechanical triggers to initiate or activate the hardware agent (or functions thereof) such as those described in U.S. patent application Ser. No. 14/479,055.

Hardware agents have a registry 125, which acts as the stakeholder's configuration. The registry 125 registers stakeholders and their IDs and other data associated with them. Of particular interest are:
  public encryption keys associated with each stakeholder's ID and for which the stakeholder holds a corresponding private key;
  stakeholder's rights to actionable information, access to memory (i.e. data containers) and control over functions;
  rules governing security (e.g. encryption of data/information); and
  check-in protocols (e.g. password required, or not).

Check-in protocol refers to the act or fact of a stakeholder presenting itself, typically wirelessly, to a hardware agent in which it is already pre-registered. A custodial stakeholder for example, would check-in with a hardware agent when the hardware agent comes into its possession. Stakeholder authorization takes place when a previously registered stakeholder satisfies the criteria required for hardware agent authorization of that stakeholder.

Stakeholder registration takes place when a stakeholder, subject to the limitation defined for a stakeholder, provides the necessary details for a hardware agent to add the stakeholder to the registry. Stakeholder pre-registration may occur, for example, when an existing stakeholder (such as the shipper of a good), subject to the limitation defined for that stakeholder, provides the necessary details to a hardware agent to add another new stakeholder to the registry, or change the terms for the other stakeholder. Stakeholder pre-authorization may also occur when an existing stakeholder, subject to the limitation defined for a stakeholder, provides the necessary details to a new stakeholder to enable the new stakeholder to self-register to the registry. It will be appreciated that other processes for registering a new stakeholder may be used. Subject to the authorization circuitry 127, a stakeholder can register or (complete a pre-registration) and check-in for the first time (the 1st check-in) during the same communication with a hardware agent.

A hardware agent 100, advantageously in conjunction with the authorization circuitry 127 and security circuitry 129 may be configured to support dynamic discovery and check-in that allows the registry to be populated automatically based on external input (e.g. a type of wireless signal).

Hardware agents have authorization circuitry 127. An exemplary function of the authorization circuitry 127 is authorizing the registry to register stakeholders and their IDs, public keys, and rights, for example. Registration may be 'open' to anyone in possession of a hardware agent or subject to authorization by the authorization circuitry 127 based on information in the registry 125. In the latter case for example, a previously registered stakeholder with the appropriate rights (in accordance with the registry 125) could pre-authorize a new stakeholder.

A stakeholder may pre-authorize or pre-register a stakeholder. In either case full registration may depend on the stakeholder being authenticated or in custody of the hardware agent. If a seller (1st stakeholder) for example, knows the buyer of its product (2nd stakeholder), it may pre-register the buyer using the buyer's ID and public key in a hardware agent embedded in a label attached to the packaging. The hardware agent may further store a password encrypted with the buyer's public key. When the buyer takes possession of the product it uses its ID to wirelessly access the encrypted password, decrypt the password with its private key, and send the unencrypted password to the hardware agent. The hardware agent verifies the unencrypted password and completes the registration process (thus conferring rights to the buyer).

Hardware agents may have the characteristic of "sparse connections" whereby they are capable of performing most transaction functions with only local connections. A local communication is one that does not require any concurrent connection to any other stakeholder, or to any data asset that is remotely located, for example, in the cloud. For example, only a local communication between a stakeholder and a hardware agent is all that may be necessary to consummate a title or financial transaction. In this way, transactions may be finalized by the hardware agent in locations and by entities without the need to have the equipment and sophistication to communicate concurrently on wide area networks.

In a similar manner, registering a stakeholder with the hardware agent does not require a real-time connection to the cloud or a remote party. Note further that stakeholders may be registered without having possession of, or being communicatively coupled to a hardware agent. A pharmaceutical manufacturer for example may register the US government Food and Drug Administration (FDA) as a non-custodial stakeholder in a hardware agent for monitoring drugs used in clinical trials.

A stakeholder's ability to check-in may depend on the authorization circuitry 127, which in turn may depend on the registry 125.

The authorization circuitry 127 may also authorize stakeholders' (and in some cases even non-registered parties) to access information (e.g. data containers and corresponding trust information; actionable, authentication and certification information etc.).

The authorization circuitry 127 may also be used to access or publish information from a hardware agent. Authorization to access or publish information (or control functions within a hardware agent) may be limited to registered stakeholders (and their rights). A stakeholder in custody of a hardware agent for example, may need to be fully registered (have the necessary 'rights') before the authorization circuitry will allow the stakeholder to access and publish information. In other cases, some information may be authorized to be released or distributed to others that are not registered. For example, a hardware agent may have embedded information, such as product model number, that can be wirelessly extracted by anyone with an RFID scanning device. But, other, more sensitive information, such as wholesale price, would only be released to an authorized stakeholder.

Hardware agents have data management circuitry 133 (a "data manager") that organizes, secures and stores raw and processed data, and actionable and other information, into data blocks or data containers. Actionable and other information can be represented as a hierarchy of data within a hardware agent. A trust set represents the superset of information and data available to the agent. Each stakeholder's data and authorized information is represented by a namespace generated by namespace circuitry 137, which is a subset of the trust set that is available to a particular stakeholder.

Figure 2:
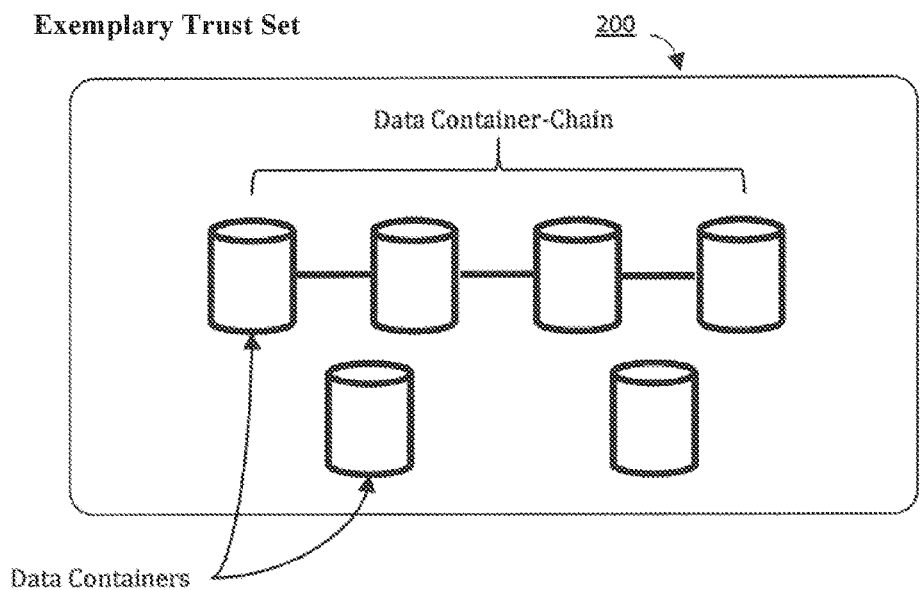
FIG. 2 is a block diagram of a trust data set in accordance with the present invention.

Referring now to FIG. 2, an example trust set 200 is illustrated. In one example, a trust set comprises a set of data containers, which each container holding some information relevant to a good's transaction. A data container may hold data regarding the specific good, such as model number, serial number, and date of manufacture. Other data containers may hold data regarding the shippers that are expected to transport the good, and other data containers may contain information about limitations and thresholds for the environment the good is subjected to. Other data containers may have pricing arrangements, escrow instructions, or other processes to enable the hardware agent to autonomously effect a transaction. It will be appreciated that other data containers may be constructed to hold additional information. It will also be understood that each data container, or set of data containers, may have encryption, authorization, or other security certificates or processes embedded within. In the trust data set 200, there are data containers 201 that hold information about the good and authorized financial transactions. Each stakeholder has access to one or more data containers. Stakeholder's data containers are mapped to specific namespace, which logically associates instances of the data containers. Data containers may contain dynamically varying data (e.g. time based sensor samples) thus the importance that a namespace is associated with an instance of a data container. In one particular implementation, a hardware agent may define a data container as an object oriented construct. Then, each specific data container becomes an instance of that parent container in a hierarchical fashion. In this way, the provider of the hardware agent can set an overall construct for the data containers, and individual data containers may be created as needed to hold specific or more limited information. As will be appreciated, such a hierarchical object oriented system may use a namespace structure for conveniently identifying those data containers associated with a particular custodian, process, or location.

Figure 3:
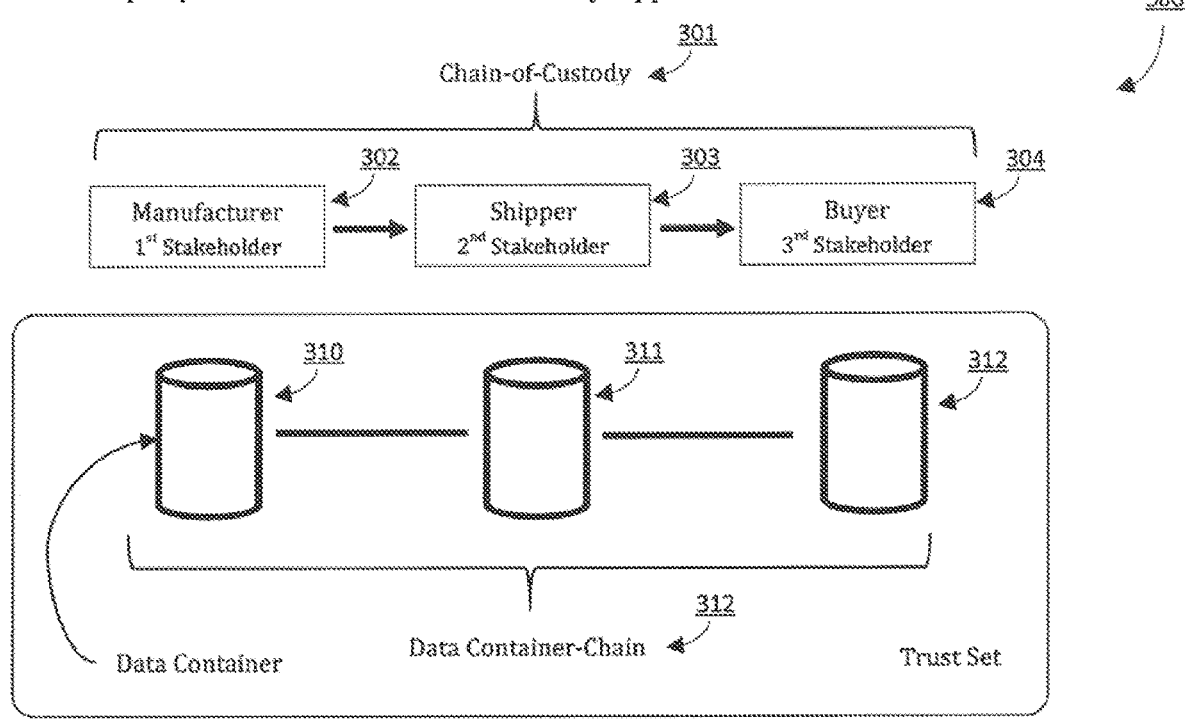
FIG. 3 is an illustration of a chain of custody using the hardware agent of the present invention.

In a typical chain-of-custody application for example, data containers correspond to the individual custodies of an agent (e.g. the periods during which the manufacturer, shipper, retailer and consumer each have custody). Together the data containers form a trust set that corresponds to the entire chain-of-custody (from manufacturer to consumer). Referring to FIG. 3, and exemplary trust set 300 is illustrated. In trust data set 300, a chain of custody 301 extends from a first manufacturer 302, to a shipper 303, to the final buyer 304. The manufacturer 302, the shipper 303, and the final buyer 304 are all stakeholders in the associated good, and for purposes of this FIG. 3 are authorized and preregistered. When the manufacturer embeds the hardware agent into the good, or attaches a label to the good, a data container 310 is stored into the hardware agent, along with the information for the manufacturer 302. Further, the manufacturer will provide the hardware agent with data sufficient to authorize the shipper 303, and the buyer 304. The shipper 303 may then take custody of the good, and information regarding the shipper and the shipping process may be stored in one or more data containers 311. For example, data containers may hold information regarding the time of receipt, the length of time the shipper had the product, or other environmental data regarding the shipping process. When the buyer 304 receives the product, a final data container 312 is made showing the buyer stakeholder information as well as information regarding the timing of acceptance of the good. Accordingly, in this way and entire data container chain 321 memorializes the entire distribution process, and enables specific transactions throughout the distribution process.

A trust set (and data containers) may include verification and certification information, business rules and parameters to support and manage transactions, govern access to the container (information within) etc. To minimize memory and communication bandwidth, outcome enabling actionable information is often preferred over raw data. In many situations for example monitored temperature data is less desirable than the set of data corresponding to temperatures that exceeded a threshold, which in turn is less desirable than a simple 'out-of-spec' message.

Data containers and trust sets may be pre-specified or dynamically generated. For example, the data manager may use check-ins to define a container's namespace (e.g. the beginning and end of a custody or a period of time) and create a container accordingly. Check-ins also may be recorded or stored in, or be associated with, a trust set. Trust sets may also include information in the registry and elsewhere corresponding to stakeholders in the trust set in the registry. Trust sets may also include information about the hardware agent, its status, versions, time/date initialized, updated etc.

Dynamically generated data containers may also correspond to "events". For example, a data container's namespace might be defined by two temperature excursions (the "events"), and its contents include all the temperature (and other environmental conditions) measured in between the events (the excursions).

Data containers and trust sets may be "public" or otherwise represent different classes of stakeholders (particularly those without unique identities). A way of creating them is simply to register public stakeholders or similarly class-based stakeholders with the appropriate rights in the registry.

Individual data containers may comprise a chain (a "data container-chain"). An exemplary data container-chain is a sequential series of data containers that correspond to entire sequential series of custodies that comprise a hardware agent's chain-of-custody. Data containers in a data container-chain may include, separately or in groups, information in support of contracts or crypto currency, or transactions thereof.

Data containers within a trust set may be independent of a container-chain and a trust set may contain combinations of both. A container's namespace may be defined by the content contained within it. Two or more data container's may share the same namespace, but contain different information. A data container may span the namespace of more than one data container. The rights of a stakeholder may define a data container's namespace and/or its contents. Importantly, a single data container may be replicated and each otherwise identical copy separately encrypted using the respective public keys of different stakeholders. A data container's namespace and the information it contains may be defined by its relationships with other data containers.

Stakeholders may have access to one or more data containers depending on the registry. Multiple stakeholders may have access to the same data container, data containers or trust set.

Data containers (and the corresponding trust set) may be secured (e.g. encrypted) according to the registered rights (policies) of stakeholders. These rights determine the data containers, if any, to be encrypted and the public keys with which to encrypt them (and thus the stakeholders than can decrypt them). This allows data containers and trust sets to be distributed without limitation, but limits the parties (stakeholders) that can access their contents.

The data manager organizes, secures and stores information into data containers according to the rights of stakeholders and information to support transactions and the management thereof, further according varying levels of authorization.

"Stakeholder information" for example may be encrypted while an expiration date may be unencrypted. That would enable a data warehouse (below) to purge its databases of 'expired' containers without having to know anything else about them. Note that data containers and their corresponding trust set may be configured to, and include the information necessary to, operate as blocks (or nodes) in a classical crypto-currency blockchain, e.g. they may have a public key/private pair (PKI); one from the originating stakeholder and from the successor stakeholder.

The data manager in cooperation with the registry, authorization circuitry, and security circuitry and password manager and other hardware agent functions as appropriate, may advantageously enable anonymous access of data containers and trust sets using a system and method such as those described below.

To maximize privacy and minimize misuse of stakeholder specific transactions (e.g. a hacker could aggregate data containers having the same ID and identifying the stakeholder via public records) hardware agents can assign non-deterministic ID's to each container or trust. A system such as the one described below, by which stakeholders or the hardware agent can generate anonymous data container ID's may be desirable. For the exemplary embodiments that follow, a stakeholder has been pre-authorized and its Common ID and public key securely loaded into the registry of a hardware agent. The stakeholder's public key is part of a PKI key-pair, where the stakeholder holds the private key. The hardware agent also has a PKI pair (previously stored or dynamically generated).

In one embodiment, when the stakeholder takes custody of the good it wirelessly "checks-in" with the associated hardware agent and presents its Common ID. The hardware agent receives the Common ID and uses it to identify the stakeholder in its registry. The hardware agent generates a password and uses the stakeholder's public key (from the hardware agent's registry) to encrypt it. The hardware agent sends the encrypted password along with the hardware agent's public key to the stakeholder. The stakeholder (1) decrypts the encrypted password, (2) encrypts the password and separately, a Anonymous ID, using the hardware agent's public key, and (3) and sends both to the hardware agent. The hardware agent uses its public key to decrypt the password (thereby authenticating the stakeholder) and the Anonymous ID that it then loads into the registry and later uses to encrypt the stakeholder's container.

In an alterative embodiment, the hardware agent generates the Anonymous ID and securely communicates it to the stakeholder when the stakeholder registers or checks-in with the hardware agent. The hardware agent generates a password and Anonymous ID and encrypts both using the stakeholder's public key. The stakeholder uses its Common ID to access the encrypted password and Anonymous ID, and uses its private key to both. The stakeholder sends the decrypted password to the hardware agent. When the hardware agent receives the decrypted password the hardware agent assigns the Anonymous ID for future encryption of the stakeholder's data containers. It will be understood that there are other known public key—private key processes that could be implemented to generate an anonymous IDs (and other secure communications).

Nodes (hardware agents or data warehouses) can filter based on the Anonymous ID, which the stakeholder can use to anonymously access 'their' containers or trusts. The stakeholder can then use the appropriate private key to decrypt the data container or trust set. The data manager in cooperation with a hardware agent's other functions (and those of other systems in a transaction system—described below) may also support "forgetting".

Forgetting may be beneficial for many reasons including data obsolescence, a hardware agent being lost, damaged or otherwise no longer relevant or privacy rules that dictate the need to forget. Forgetting can be accomplished by making the transaction unreachable, destroying the key used to unlock the data or adding the transaction to a 'black list' etc. Forgetting actions may be in response to contracts (described herein) in support of agreements between stakeholders. Forgetting may be particularly useful where transaction storage is immutable (e.g. a blockchain) and in transactions involving escrow or other contingencies (e.g. the ability to cancel or reverse previously executed transactions).

The security circuitry includes encryption circuitry used for example to encrypt data containers and trust sets using appropriate stakeholder's public keys. When encrypted using a stakeholder's public key, only that stakeholder will have the corresponding private key that can decrypt the data container, trust set etc. In a preferred embodiment, stakeholders provide their own public keys (and maintain their own private keys). They may be provided via a public registry where they are available for stakeholders to pre-authorize or pre-register other stakeholders, or register themselves. This approach reduces the administration and risk of generating, distributing and managing keys, and importantly avoids a system dependency.

As part of the security circuitry hardware agents may include a password circuitry. With password circuitry, a hardware agent can generate and administer passwords for use in authenticating pre-authorized or pre-registered stakeholders etc. Internally generated passwords can be encrypted with a stakeholder's public key and stored until the stakeholder communicates with the agent—thus avoids exposing the unencrypted password.

The security circuitry may also have PKI circuitry to administer and support PKI services (or other security systems and methods) including generating and storing public/private key pairs. The PKI circuitry advantageously used in collaboration with the registry, authorization circuitry, data manager, namespace circuitry etc. to secure data containers and trust sets, communications and transactions, etc.

Public publication of stakeholder's IDs and associated public keys, simplifies authorization and registration. It also provides an efficient means to secure and identify data containers and trust sets specific to a particular stakeholder. That in turn allows nodes, e.g. both hardware agents and data warehouses (below), to efficiently organize and manage published data containers and trust sets.

As discussed previously, of particular interest to stakeholders is information that enables actions and transactions, otherwise referred to herein as actionable information. Actionable information, as the term is used herein however should also be understood to include all data and information advantageous to stakeholders (particularly in support of, participation in, transactions).

Stakeholders are parties with a direct or indirect stake in an agreement, contract, or hardware agent, or the actions, transactions or other outcomes thereof. Exemplary stakeholders include buyers, sellers, consumers, shippers or insurer, finance companies, service organizations, regulatory agencies, individuals (e.g. consumers and users) and other hardware agents etc.

Stakeholders have rights to actionable and other information that they typically exercise by being able to decrypt the data containers and/or trust sets that contain them. As previously described, stakeholders may also have rights to access a hardware agent's memory (read/write) or control its functions. Stakeholders may be custodial or non-custodial. A custodial stakeholder is one that takes custody of a hardware agent (e.g. by checking-in).

In some embodiments, a stakeholder may be one of a class of stakeholders and as such may not be independently registered with a hardware agent. In such circumstances, the actionable information in the form of data containers or a trust set associated with this class of stakeholders (e.g. via a shared ID, would typically be unencrypted).

Each stakeholder needs secure and reliable access to actionable information from the hardware agents in which it has a stake. Of particular interest therefore are decentralized network architectures that distribute the computing elements and data among autonomous nodes. Each node in the network holds equivalent authority to the whole and corruption of any node will not impact the operation of the system. In contrast, a centralized network architecture, often referred to as client server, exhibits a single point of failure in the server component.

A preferred decentralized network would exhibit the following characteristics:
  ability to discover and add additional nodes dynamically;
  peer to peer (node to node) communication;
  distributed application;
  database is distributed for security and reliability; and
  data and application information is based on a trustless network (i.e. the system provides the security there is no need to trust any "single authority.")

Publish as the term is used herein, is a shorthand way of expressing the distribution of actionable and other information (data containers and trusts), particularly in the context of a distributed architecture. According to the authorization circuitry a stakeholder or otherwise authorized party (or any party) in possession of the hardware agent could access and publish data containers and trust sets (e.g. an on-line retailer via an internet connected RFID reader, or its customer with an app on an NFC enabled smart phone). Because they are encrypted only the appropriate stakeholder can decrypt them and access their contents.

As a 'node' a buyer could use an Internet connected RFID reader, and/or later an end-user (e.g. consumer) could use an app on their RFID or Bluetooth enabled smart phone, to access and publish a data container from a hardware agent that would be distributed to all of the nodes in the network.

A data warehouse provides a decentralized mechanism for the storage and retrieval of published data containers. Data warehouses are nodes in a decentralized network that offer services such as publish, push/forward and supply on-demand. All data served by the data warehouse is encrypted and can only be accessed by stakeholders with the appropriate level of authorization (e.g. public/private keys). Data warehouses serve as a reliable data source to stakeholders who may choose to be intermittently connected, thereby reducing network load and increasing data security.

Data warehouses offer system level security by offering services such as the following:
  comparing encrypted data between themselves to 'certify' the results; alternatively, stakeholders can compare info from one warehouse to another and self-certify; and
  individually or in groups, certifying actionable information was available (and when) to all parties, and enable escrowed transactions (using complementary business rules); it's up to each of the stakeholders to dispute or challenge a transaction or outcome by a specified time, and it can be certified that they had the information available to do so; and servicing title insurance.

A hardware agent transaction system may be used to effect transactions according to explicit and implicit agreements between stakeholders. Agreements are implemented in transaction systems through "contracts." Contracts set the rules by which a hardware agent's actions, and those of other systems within the transaction system (e.g. those of stakeholders), are formed into a transaction (or transactions). Contracts set the actions of hardware agents including for example, the generation of data containers. Data containers are collections of data (input and generated) or rules and other elements necessary to effect transactions in support of agreements. In some applications, a data container may contain a partially or wholly executed contract, or stakeholder-specific versions of the contract.

In general, contracts determine many of a hardware agent's actions that involve the registry, authorization circuitry, data manager, security circuitry, namespace circuitry and other functions such as visual or audible verification (determination and interpretation), as necessary to implement the agreement. As described elsewhere herein, the stakeholders to the agreement can register and check-in with the hardware agent following a number of different methods in accordance with the contract (e.g. self-registered, pre-registered, pre-authorized etc.).

Example Transaction System—Settlement

Figure 4:
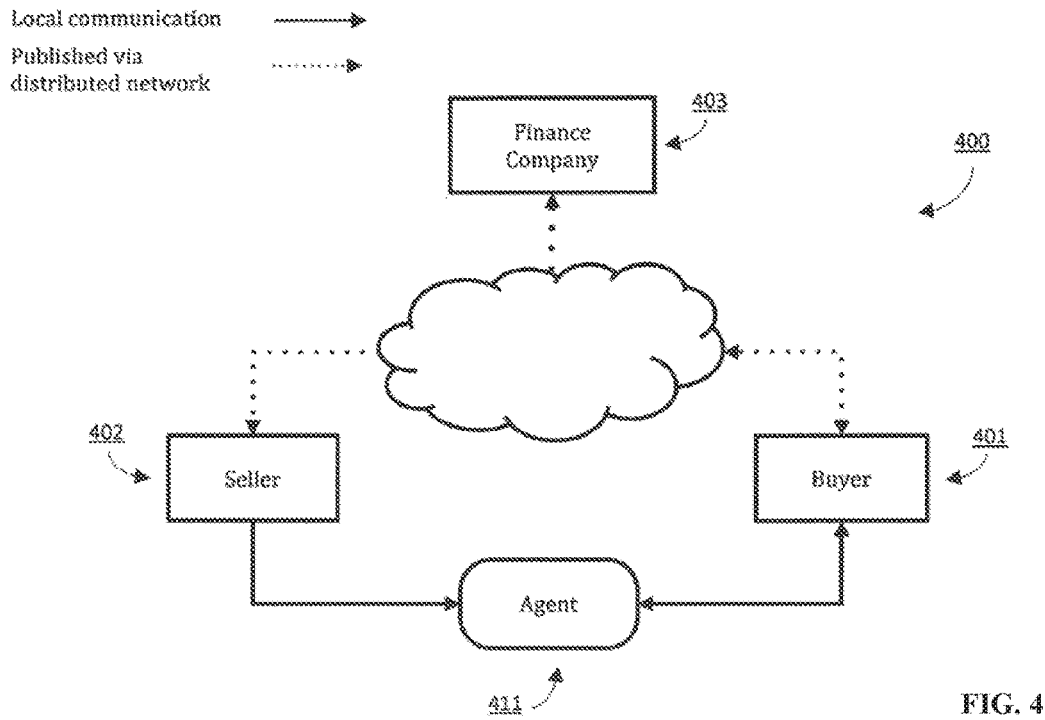
FIG. 4 is a data diagram of a transactional system using a hardware agent according to the present invention.

FIG. 4 depicts a transaction system 400 to effect a simplified agreement between buyer 401, seller 402 and a finance company 403 (stakeholders) involving a good in which the finance company 403 has a security interest and to which the seller 402 has a financial obligation. As part of the agreement (separate from the contract) the seller 402 will bind an hardware agent 411 to the good prior to shipment, and upon delivery of the good to the buyer 401 effecting a change in custody, the buyer 401 will publish data containers from the hardware agent 411 via a distributed network to the stakeholders.

In this example, a contract could implement the agreement by setting the hardware agent so that the following actions take place once the buyer 401 takes custody of the good A. The buyer 401 remits funds (payment) to the finance company 403.
B. The finance company 403 (1) Receives funds from the buyer 401; (2) releases its security interest in the good; and (3) remits funds to the seller 402 (the amount of the payment from the buyer 401 less its security interest).
C. The seller 402 (1) receives funds from the finance company 403; (2) transfers title to the buyer 401.
D. The buyer 401 receives title to the good.

In an alternate implementation, the hardware agent 411 could fully execute the contract on behalf of the stakeholders immediately upon the buyer 401 accepting custody of the good. The flow and post-agreement interactions between the stakeholders are thereby eliminated, and a more limited set of transactions take place:

A. Title is transferred
B. The security interest is cancelled
C. Funds are transferred (seller 402 and finance company 403 each get their share)

With the contract in this later implementation, the hardware agent 411 forms the title, payment and other digital records and information when the buyer checks-in (takes custody of the good). As specified in the agreement and implemented with the contract, the funds may take the form of a crypto-currency or a variety of financial instruments that can be presented to conventional financial/banking systems.

In some implementations, a contract may be partially executed and subsequently published (e.g. as a data container for incorporation into a blockchain). And further, in some implementations, a contract, and by extension an agreement may be fully executed only after the actions of some or all of the stakeholders subsequent to the publishing of the data containers (e.g. all the stakeholders receiving data containers formed by the hardware agent advantageously including the contract or elements thereof).

Example Transaction System—Dynamic Pricing

Figure 5:
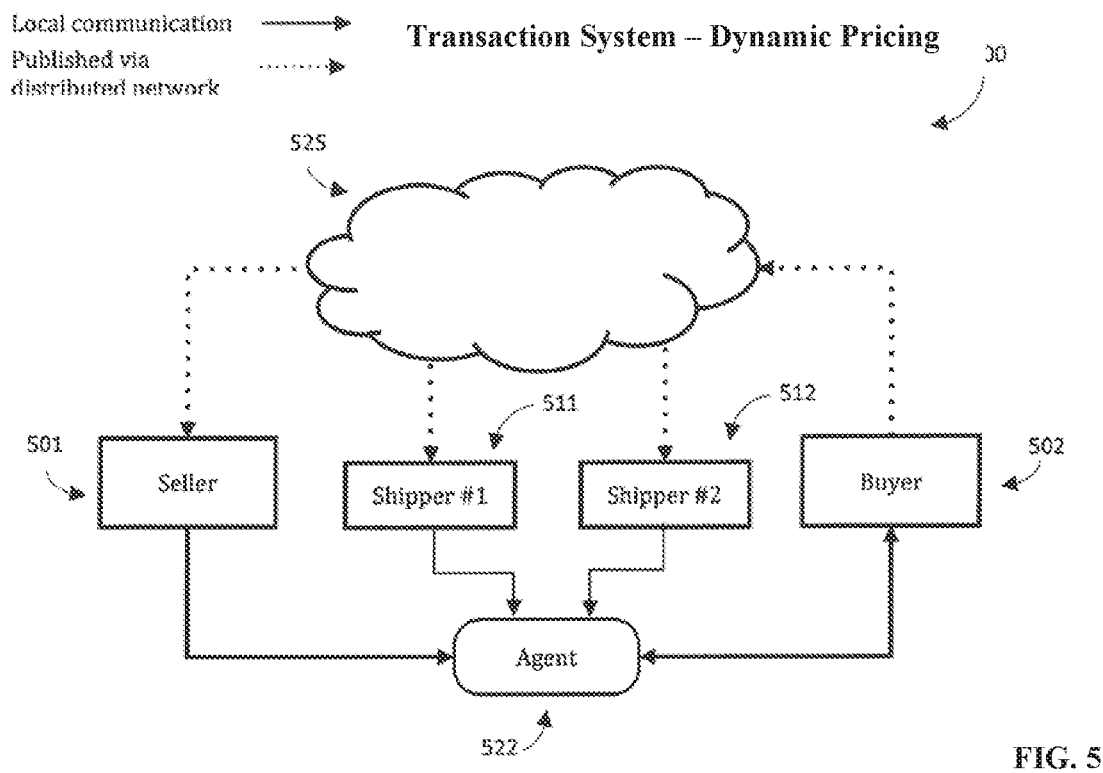
FIG. 5 is a data diagram of a transactional system using a hardware agent according to the present invention.

In another example, a transaction system 500 (FIG. 5) effects a 1st agreement between a seller 501 and a buyer 502, and a 2nd agreement between a seller 501 and a 1st shipper 511 and a 2nd shipper 512.

With the 1st agreement, the seller 501 agrees to sell, and a buyer 502 agrees to buy from the seller 501, a good for a set price. The seller 501 and buyer 502 also agree that the price will be adjusted (e.g. discounted) in response to a monitored condition exceeding a set threshold (a threshold event) as determined by a hardware agent 522 attached to the good. The seller 501 agrees to bind the hardware agent 522 to the good and upon delivery of the good to the buyer 502 effecting a change in custody; the buyer 502 agrees to publish data containers from the hardware agent 522 (including those from the 2nd agreement below) via a distributed network 525 to the stakeholders.

Separately the seller 501 enters into agreements with a 1st shipper 511 and a 2nd shipper 512 where payment of the shippers' fees by the seller 501 is contingent upon: (1) the shipper checking-in with the hardware agent 522 when it takes possession of the good, and (2) the absence of a threshold event during the shipper's custody of the good.

In the implementation of the example agreements above, contracts specify the hardware agent's 522 actions on behalf of the stakeholders such as the following to take place once the buyer 502 takes custody of the good.

The buyer 502 (1) remits payment to the to the seller 501 based on the determined price and (2) receives title to the good.
The seller 501 (1) receives payment from the buyer 502 and (2) remits payment, if any, to the shippers 511/512.
The shippers 511/512 receive payment, if any.

A shipper 511/512 receives payment if it accepts custody of the good (checks-in with the hardware agent), takes care of the good while it is in its custody (the absence of a threshold event while the good is in their custody), and delivers the good to the successor custodian (the successor custodian checks-in).

In this example, the hardware agent would be configured with a power source (e.g. a battery) and a sensor or clock/timer for monitoring the specified condition (e.g. temperature, shock and vibration, or elapsed time). As the good moves through the supply chain, the bound hardware agent 522 would (1) monitor the condition of the good and (2) determine if a threshold event occurred during the custody of one of the custodians (e.g. one of the shippers). If so, the hardware agent 522 would further determine (1) the custodian that had custody when the threshold event occurred (by knowing the last custodian to check-in before the threshold event) and (2) the price to be paid by the buyer (by applying the set discount against the set price) and the corresponding remittance to the seller.

As in the previous example (and in the example that follows) the hardware agent's actions specified by the contracts involve functions such as the agent's registry, authentication circuitry, security circuitry, data manager, namespace circuitry etc. And the stakeholders to the agreement can be registered with the hardware agent 522 following a number of different protocols in accordance with the contract and described elsewhere herein (e.g. self-registered, pre-registered, pre-authorized etc.) And further, the contracts can be fully executed by the hardware agent and published by the buyer in accordance with the agreement.

Note that in accordance with an agreement and actions specified by contracts, the hardware agent 522 can form containers at different times (e.g. in response to events or stakeholders checking-in with the hardware agent etc.) and the containers can be published at different times by different stakeholders (e.g. the current custodian). In a variation on the above agreements and contracts, a shipper 511 for example could publish a data container after checking-in thus providing the seller 501 (and buyer 502) with updates on the good (e.g. custodian, conditions) and effect a transaction where the previous custodian receives payment immediately upon the conclusion of their performance under a contract. The transaction system could also effect transfer of title as the good passes through the chain-of-custody. In addition to effecting independent transactions, this implementation of a transaction system would lend itself to supporting blockchains.

Example Transaction System—Escrow

Figure 6:
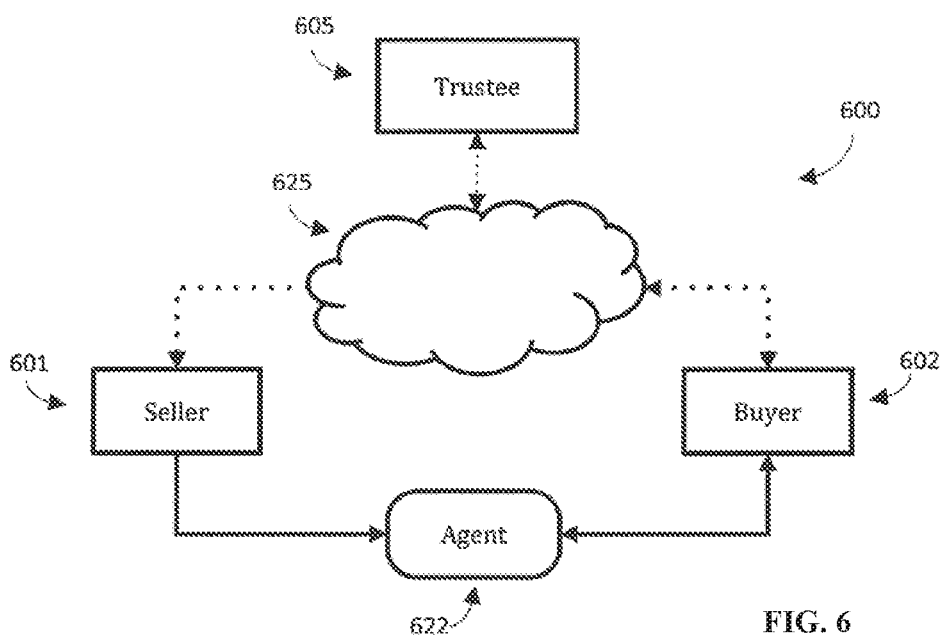
FIG. 6 is a data diagram of a transactional system using a hardware agent according to the present invention.

In another example, a transaction system 600 (FIG. 6) effects a simplified escrow agreement involving a seller 601, a buyer 602 and a trustee 605. The agreement stipulates that the seller 601 will sell to the buyer 602, and the buyer 602 will buy from the seller 601, a good for a set price. Further, prior to shipment of the good, the buyer 602 will place into escrow with the trustee 605 funds equal to the price of the good, and the seller 601 will place into escrow with the trustee 605, title to the good. As part of the agreement the seller 601 will register the buyer 602 and trustee 605 with a hardware agent 622, and bind the hardware agent 622 to the good prior to shipment. Further the seller 601 and buyer 602 will check-in with the hardware agent 622. The buyer 602 having checked-in with the hardware agent 622 (effecting a change in custody) will publish a data container from the hardware agent 622 via a decentralized network 625 to the stakeholders (including the trustee 605). Upon receipt of the data container from the hardware agent 622 (confirming buyer's 602 custody), the trustee 605 will transfer title to the buyer 602 and payment to the seller 601. In this example, a contract could implement the agreement by specifying the following actions take place by the hardware agent 622 and the trustee's 605 system:

The hardware agent 622 (1) registers the seller 601, buyer 602 and trustee 605; (2) accepts check-ins from seller 601 and buyer 602 and (3) forms a data container with the above information.

The trustee's 605 system (1) verifies the buyer 602 checked-in with the hardware agent 622; (2) transfer funds to the seller 601, transfer title to the buyer 602; and (3) publishes executed agreements to seller 601 and buyer 602.

Note that the transfer of funds and title can be executed digitally or by conventional means depending on the currency and terms agreed upon by the stakeholders.

A variety of security methods utilizing hardware agents 622 can be employed to authenticate transactions, the participants and elements thereof. A simple contract for example could specify actions so the trustee 605 can authenticate both the seller's 601 and the buyer's 602 participation in the transaction (the trustee 605 can determine that the data container it receives from the buyer 602 came from the hardware agent 622 that the seller 601 bound to the good). In addition to the above actions the contract could specify that the trustee's ID 605 and PKI public key are included when the trustee is registered by the seller 601. Accordingly, the hardware agent 622 encrypts the data container to be published by the buyer 602 using the trustee's 605 public key, and the decrypts the data container published by the buyer 602 using its private key (corresponding to its public key.)

The above transaction system could also effect an escrow agreement with pricing or other terms based on monitored conditions or changes in custody such as those previously described herein.

Figure 7:
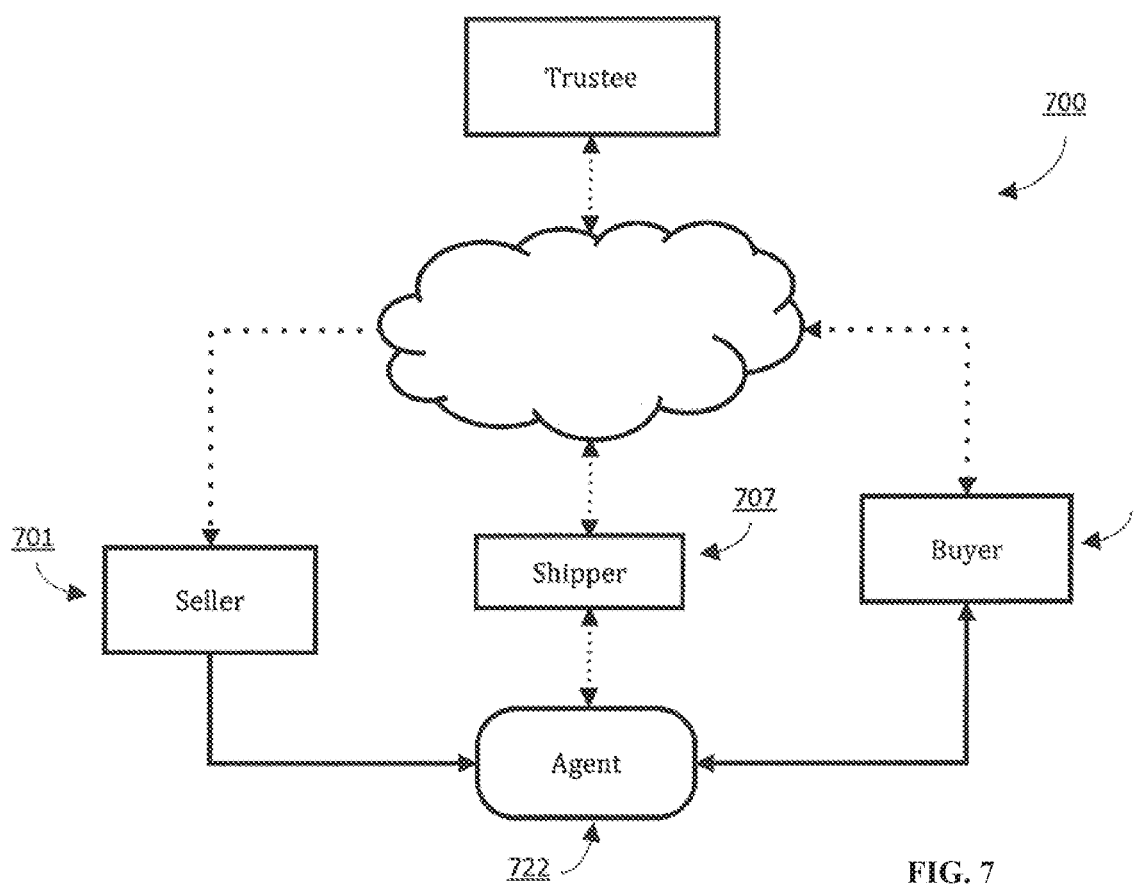
FIG. 7 is a data diagram of a transactional system using a hardware agent according to the present invention.

As depicted in FIG. 7, a transaction system 700 modifies the transaction system 600 to effect a variant of the basic escrow agreement where upon delivery of the good to the buyer 702, a shipper 707 publishes the data container formed by the hardware agent 722 after delivery to the buyer 702, or better, after the buyer 702 checks-in with the hardware agent 722 (accepts custody).

Rights Management and Information System.

Referring now to FIG. 8 through FIG. 21, a rights management information system is described. The rights management and information system may advantageously be used with the hardware agent described with reference to FIGS. 1 through 7, but has extended capabilities particular to trusted transactions with regard to rights in assets.

Figure 8:
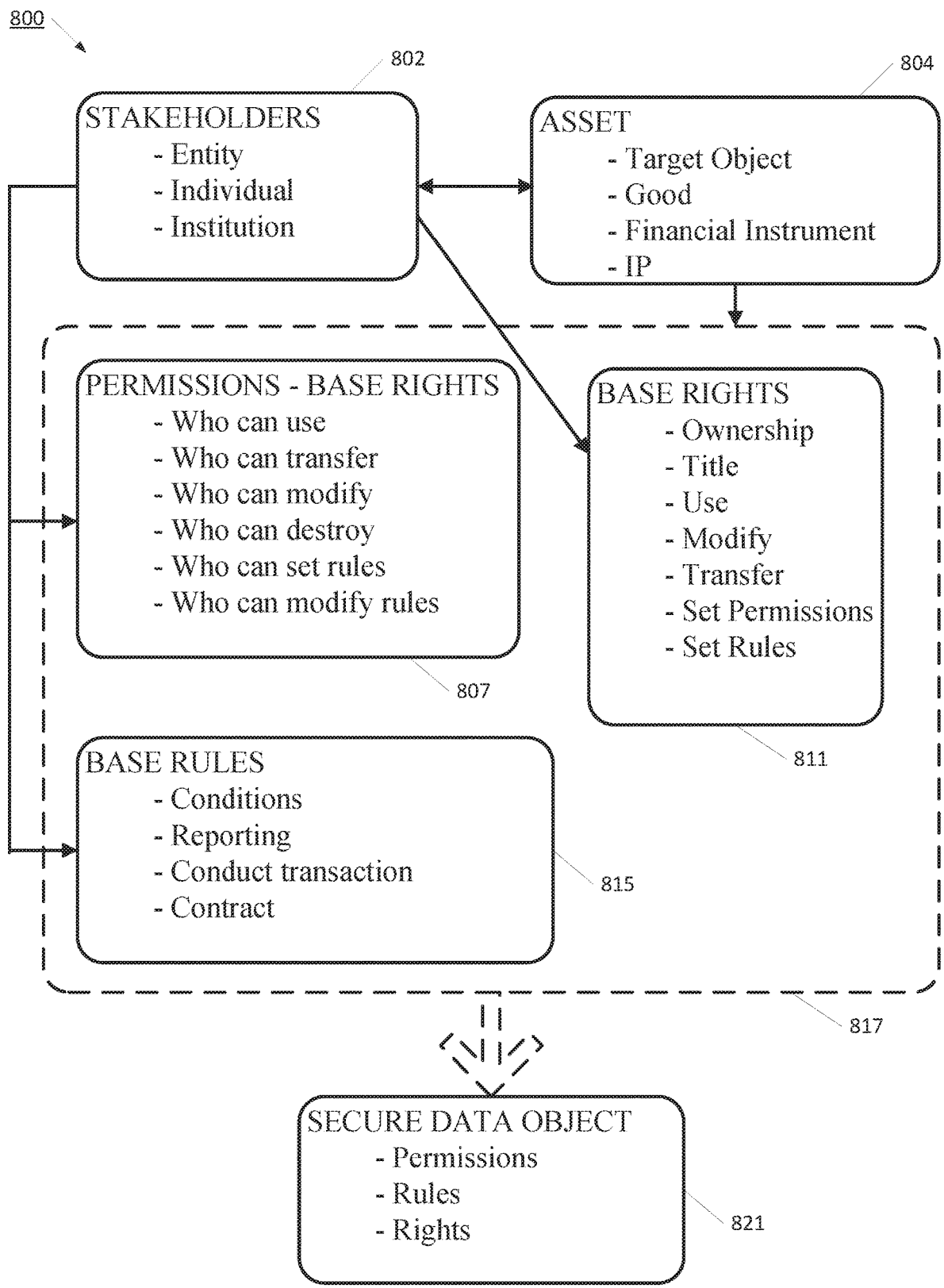
FIG. 8 is a block diagram of an information system using secure data objects according to the present invention.

With reference now to FIG. 8, general relationships within the information system 800 will be described. The information system 800 has one or more stakeholders 802. These stakeholders 802 may be individuals, corporations, organizations, cooperatives or any type of entity that is capable of owning, controlling, or extracting value from assets. In this regard, the stakeholders 802 have a stake in an asset 804. The asset 804 is one of the target objects for the information system 800, that is, the asset is what is distributed, transacted, monitored, used, transformed, or otherwise affected or effected by the information system 800. These assets 804 may be physical assets such as goods, products, or inventory, or may be intangible assets such as intellectual property, financial and legal instruments, insurance value, or accounts receivable. Indeed, almost anything that a stakeholder or customer might value could be considered an asset 804.

Each of the assets 804 have one or more rights 811 associated with them. These rights 811 may be an individual right, or may be a bundle of rights. In its most basic sense, a right is having ownership of the asset or legal title to the asset. In a somewhat broader sense, an entity may have a right to use the asset, to modify the asset, to transfer the asset, or the sell the asset. Further, not all rights flow from legal ownership, for example, a digital right in a blockchain may simply be the right to update a registry, which flows from the collective agreement of a large number of independent third parties as to when, and if, the digital asset can be accepted into the blockchain. In another aspect, the rights 811 to an asset may include the right to set permissions on who may set or modify permissions to access or expose the rights, and to set rules on how the asset can be used or transferred, for example.

In setting up the information system 800, the stakeholders typically own or have control of base rights 811 to asset 804, or to a group or class of such assets. One of these rights is the right to set base permissions 807 for the asset 804. Base permissions 807 can be, for example, who can use the asset, who can transfer the assets, who can modify the asset, who can destroy the asset, who can set additional rules for that asset, or who can modify those rules. In this way, the stakeholders 802 maintain ultimate control over who has access to the base rights 811, and what affect they may have on the rights 811 and assets 804.

Additionally, the stakeholders 802 may set base rules 815 for asset 804. These base rules set out the initial allowable uses or transfer of, or interactions with, the asset 804. For example, the base rules 815 may set out the conditions under which the asset is to be transferred through a distribution system. In one specific example, the base rule 815 may set out that the asset is a perishable good that should not be allowed to go beneath or above a set temperature threshold, e.g. 25° F. The base rules 815 would also set out what would happen if that condition were violated, e.g. the price of the good is automatically adjusted downwards. Base rules 815 can also include reporting requirements for anyone using or transferring the good, setting rules for conducting transactions regarding the asset or rights associated with the asset, and in some cases even proposing and executing binding contracts regarding the asset or its rights.

The stakeholders 802, thereby set the initial boundaries 817 for others to interact, use, and extract value for the asset 804. These initial boundaries 817 contain one or more of base permissions 807, base rights 811, and base rules 815. These initial boundaries 817 may then be set in a secure software-data object referred to herein as a secure data object 821. Secure data object 821 may be constructed as a secure software object that contains data representing permissions, rules, and rights, including but not limited to base permissions, base rules and base rights. Often, the security data object 821 will have security, verification and encryption features to assure the secure data object 821 is only accessible to authorized entities and to verify its integrity.

Figure 9:
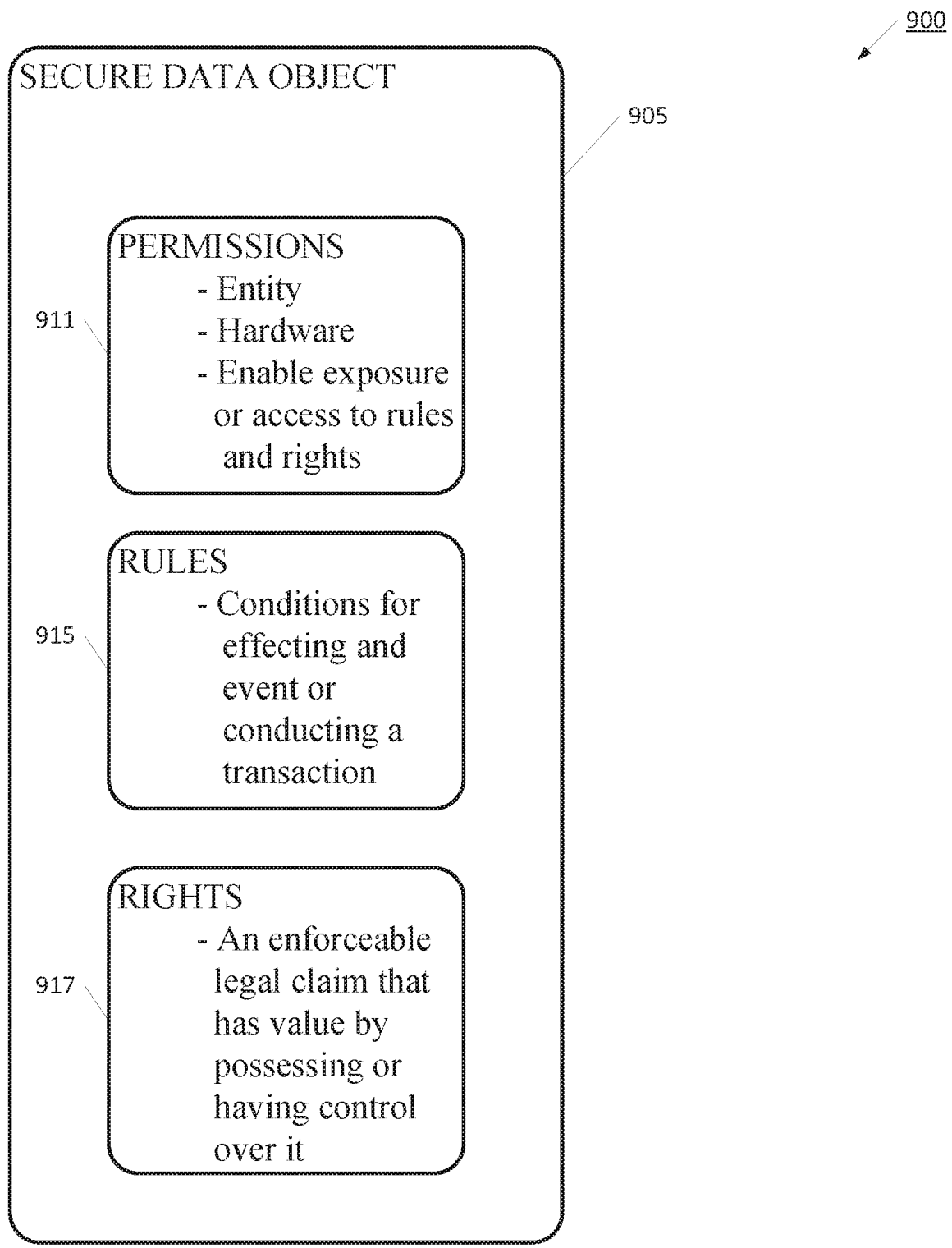
FIG. 9 is a block diagram of a secure data object according to the present invention.

Referring to FIG. 9, an example of a secure data object 900 is illustrated. The secure data object 900 is a software-data object 905 that contains one or more information fields. One information field may hold permissions 911. These permissions 911 may set out which entities, via host computer systems or hardware agents, are able to access what information within the secure data object 905, and set limits as to whether they may only view that information, they may use that information, or they may modify that information, or they may transfer that information. Also, in some cases the permissions 911 will set out particular types of hardware agents that are able to use the secure data object. Again, these permissions 911 will set limits of the hardware agent's ability to view, use, modify, or transfer information within the secure data object. More generally, the permissions 911 define what host computer systems and hardware agents are able to have exposure or access to rules and rights, and what they are able to do with those rules and rights. Note that an entity operates through host computer systems and hardware agents. Note further that the term host generally speaks to a computer system but depending on the context and usage, may include hardware agents as well. Also, a host computer system or a hardware agent may be considered to host a secure data object. Secure data object 905 may also contain an information section holding the rules 915. These rules 915 set out conditions for effecting an event or conducting a transaction. Finally, the secure data object 905 also contains rights 917 associated with a particular asset. As described earlier a right is an enforceable legal claim that has value by processing or having control over an asset.

A key aspect of the secure data object 905 is for the permissions 911 to define what entities or hardware agents are able to use the rules 915 and rights 917, and to what extent an entity a host or hardware agent is able to modify, transfer, destroy, or conduct a transaction. For example, a permission may be set up such that a host or hardware agent is only able to read a secure data object, and communicate that secure data object to particular entities without any modification. In another example, a permission may be set up such that an entity is able to use information within the secure data object, and then send a set of the secure data object information to another entity. In such a case, that entity would be allowed, that is, have sufficient permission, to extract information from the secure data object, and generate a set of that information into a limited data object that can then be transferred to other entities, including other hardware agents.

Sometimes, it may be desirable for the stakeholders to cause the entire set of base permissions, base rules, and base rights to be transmitted along the entire distribution path. In this way, the stakeholders can assure that every downstream entity or hardware agent will receive the full set of rules, rights, and permissions that were originally set in the secure data object. In other cases, the stakeholders may define rules, rights and permissions, such that follow-on hosts or hardware agents may be allowed to generate or transmit only a subset of the permissions, rules, and rights. This could be useful, for example, if at selected times in the distribution chain it is desired to publicly post limited information regarding the transaction. In this way, the host or hardware agent may generate a limited data set specifically for posting to a public site, or to a blockchain, for example. In another example, a hardware agent may be attached to a case of wine, and therefore the permissions, rules, and rights attached to that hardware agent would include the permissions, rules, and rights for transacting commerce for an entire case of wine. However, if at some point during the transaction the hardware agent, according to the rules and permissions, has allowed the case to be broken-down to individual bottles, and individual hardware agents have been attached to the individual bottles, those individual hardware agents could be loaded with only a subset of the initial permissions, rules, and rights. More specifically, although the stakeholders may desire that they still control the distribution at the individual bottle level, there no longer is any need to communicate the case-level information as the individual bottles continue to move through the stream of commerce.

Accordingly, it will be understood that the secure data object may take many forms as it is received, used, and transformed by, and transported among hosts and hardware agents. In some cases the original, parent secure data object may contain permissions and rules that define if and how child data objects may be created and transmitted. Child data objects are secure data objects, although with potentially different permissions, rules and rights according to the permissions, rules and rights of their parents. The latter being, or determined according to, the base permissions, rules and rights of the initial secure data object determined or formed by the stakeholders. In this way, the initial stakeholders have a great deal of flexibility in defining the specific processes that may or must apply as their asset moves through a chain of commerce.

Figure 10:
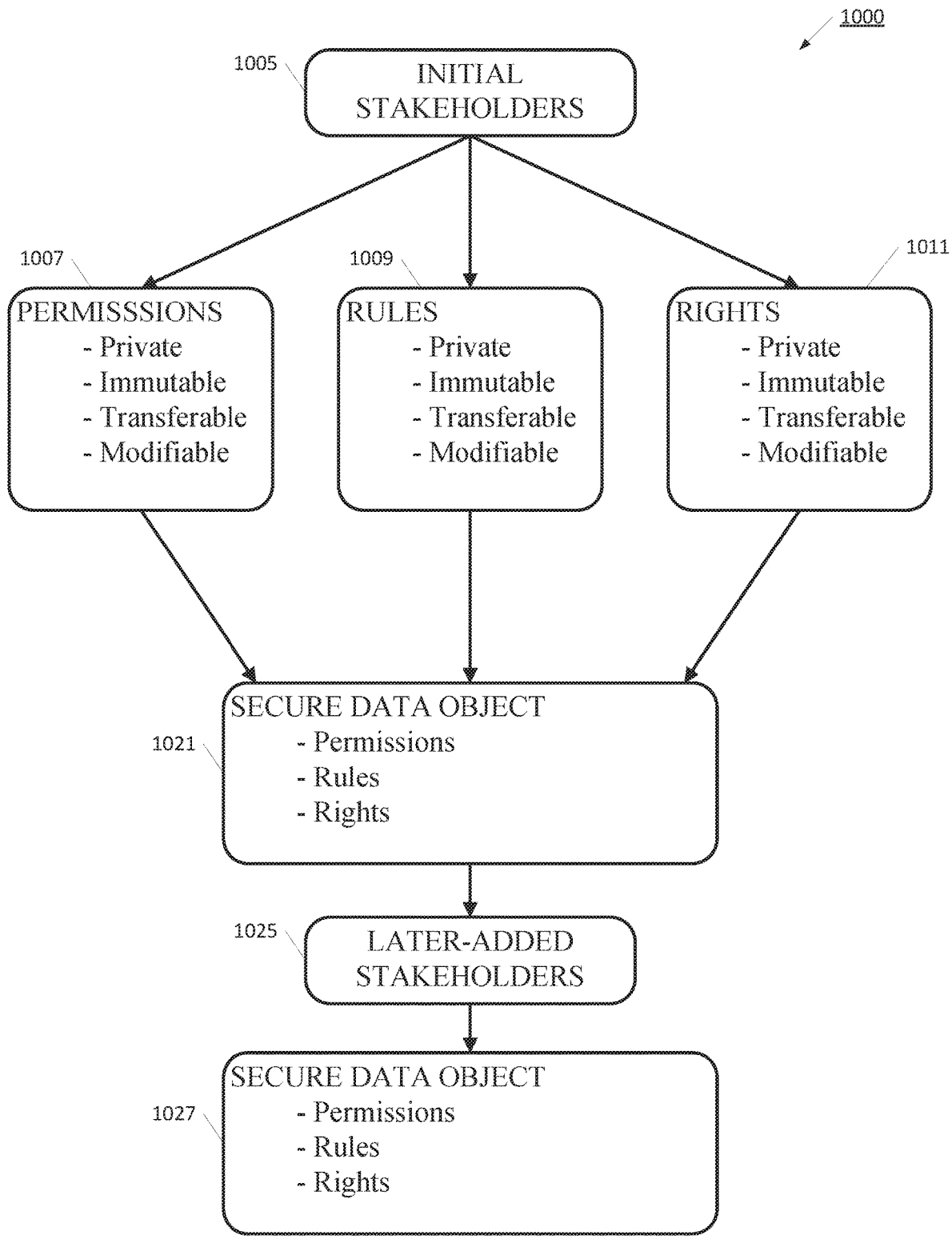
FIG. 10 is a block diagram of an information system using secure data objects according to the present invention.

Referring now to FIG. 10, an information system 1000 is illustrated. As described with reference to FIGS. 8 and 9, a set of stakeholders 1005 define permissions 1007, rules 1009, and rights 1011, which include base permissions, base rules and base rights as described with reference to FIG. 8. The permissions 1007 may be private, that is they are set by the stakeholders and would not be exposed through a chain of distribution. In this way, private information may be held in the security to secure data object 1021, and only exposed at a later time pursuant to a stakeholder 1005 permission. Such a private permission would be valuable, for example, in setting up an escrow account or trustee relationship. Certain permissions 1007 may also be immutable, that is, they are persistent and unchangeable as they move through the information system 1000. In other cases, provided an entity has sufficient permission, certain permissions may be modifiable or added. This may be useful for example, if one or more of the initial stakeholders 1005, provided certain conditions are met, desires that a downstream entity be allowed to adjust the permissions of who can effect rules and rights. In some cases, the permissions 1007 may be transferable. That is, a particular entity may have a permission level to perform a certain rule, but may transfer that permission to another entity.

The stakeholders 1005 also set rules 1009, which, like permissions 1007 may be set up to be private, immutable, modifiable, or transferable. In a similar way, the stakeholders 1005 also define rights 1011 in an asset. These rights may also be private, immutable, modifiable, or transferable. The permissions 1007, rules 1009, and rights 1011 may a comprise a superset of those available for determining or forming the initial secure data object 1021. In that case stakeholders 1005 may include in secure data object 1021 all the permissions 1007, rules 1009 and rights 1011. In other cases, the stakeholders 1005 may determine or form a secure data object with less than all the permissions 1007, rules 1009, and rights 1011. In this way, the stakeholders 1005 may determine or form an initial secure data object 1021 according to the application specific requirements for a particular asset.

As the asset moves through the information system, if the permissions 1007 permit, additional stakeholders 1025 may be added. For example, if the asset is sold and its value is added to an accounts receivable ledger, a bank which holds an interest in the accounts receivable may desire to become a stakeholder in the asset. In this say, the new stakeholder 1025 may be given sufficient permission to be added as a stakeholder, and to add, modify, or remove existing permissions. These new or adjusted permissions, rules, and rights may then be formed into a new secure data object 1027 that reflects the interests of the new stakeholder 1025, but maintains the interests that the original stakeholders 1005 required.

Figure 11:
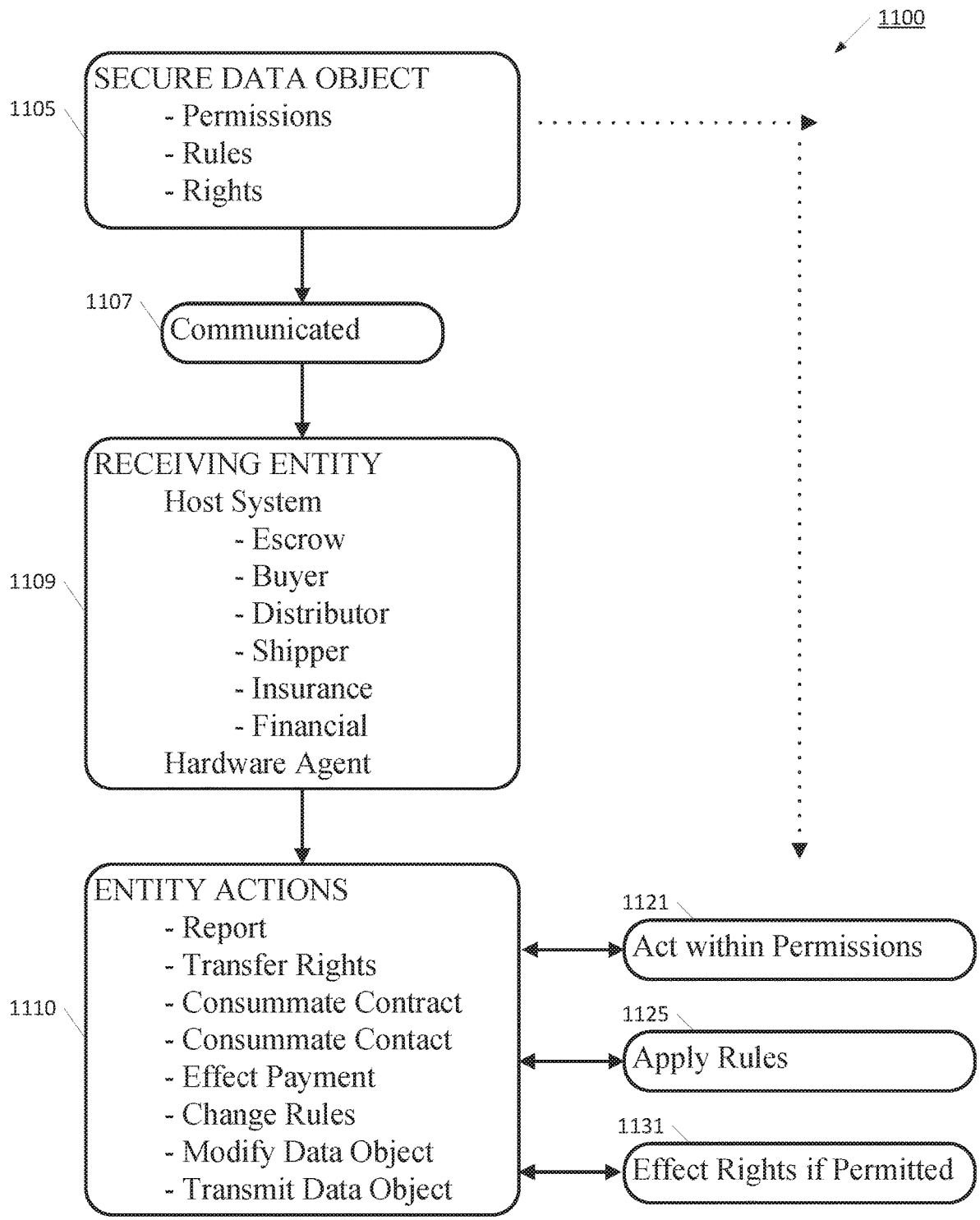
FIG. 11 is a block diagram of an information system using secure data objects according to the present invention.

Referring now to FIG. 11, an information system 1100 is illustrated. The information system 1100, in one specific example embodiment, is a distribution system for an asset, such as a physical good. Information system 1100 has a secure data object 1105 similar to the one defined with reference to FIG. 10. Often, the secure data object 1105 will be introduced into a distribution system by stakeholders that will communicate 1107 the secure data object 1105 to a receiving entity 1109. Sometimes the receiving entity 1109 will be a host system in the form of a computer or mobile phone, and in some cases the receiving entity 1109 may be a hardware agent as described earlier in this application. If the receiving entity 1109 is a host system, that host system may be part of an escrow system, may be a buyer interested in the asset, may be a distributor or shipper of the asset, may be an entity trying to insure the asset, may be a financial or legal instrument associated with the asset, or a user. In the case where the receiving entity 1109 is a hardware agent, the hardware agent may in some cases be physically attached to the asset, configured for example as a label or tag. In other cases, the hardware agent may be moved independent of the asset.

The receiving entity 1109 receives the secure data object 1105, which contains permissions, rules, and rights as defined by the stakeholders. The receiving entity 1109 is only able to act if it has appropriate permissions or permission level 1121. In this sense, the first action the receiving entity 1109 will perform is to check if it has any permissions asked of this asset, and if it does, it then will be permitted to apply the allowable set of rules 1125, and if allowed by permissions, effect the rights of the asset 1131. Importantly, the receiving entity 1109 is only able to act within the permissions or permission levels set by the secure data object 1105. Depending upon its permissions, receiving entity 1109 may be able to take certain entity actions 1110. The receiving entity 1109 may, for example, if permitted, be able to report activities, transfer rights, consummate contracts, consummate and report contact with the particular entity, effect payment, modify rules, modify the data object, and transfer the data object. In one particular case, the receiving entity 1109 may be able to take certain allowed actions with the asset, and then create a modified data object for sending back to the stakeholders, or to another entity downstream. In another example, the receiving entity 1109 may create a modified data object to be sent to an escrow agent or trustee, or to send the modified data object to be included in a blockchain.

Figure 12:
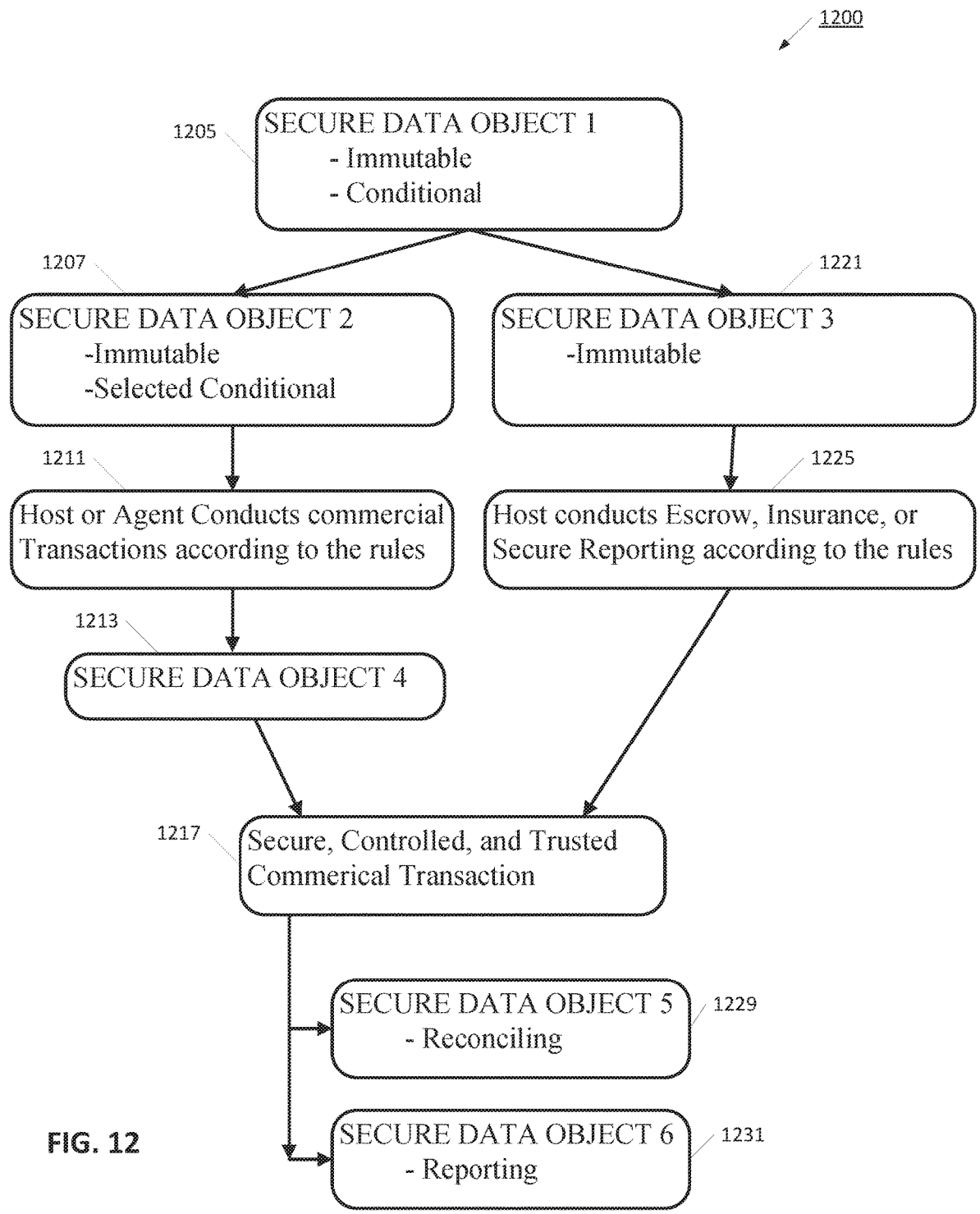
FIG. 12 is a block diagram of an information system using secure data objects according to the present invention.

Referring now to FIG. 12, an information system 1200 is illustrated that has a secure data object 1 1205 that has been generated according to the interests of a stakeholder or multiple stakeholders in an asset, as previously described. In this example, the secure data object includes immutable information. The immutable information may take the form of permissions, rights, or rules and may not be changed by any entity as the secure data object or derived data objects if any, moves through a chain of custody. This enables the stakeholders to exert an influence and maintain ultimate control of how the secure data object and any child data objects, and by extension the associate asset, is transferred, used, or disposed of as it moves through a distribution chain. The secure data object 1 1205 may also include rights, permissions, and rules that may be modified pursuant to an entity's permissions or permission level, rules and rights. In this way, a stakeholder may give as much flexibility as needed for permissions, rights, and rules to be modified as the asset or the secure data object moves through the chain of custody.

As previously stated, secure data object 1 1205 has rules set by the one or more stakeholders. These rules set out the allowable conditions and transactions regarding the asset, including allowable changes to rights, permissions, and rules. These rules may take many forms. For example, these rules may set out the physical environments that are allowed for a physical good, and the actions to be taken or reported if those environmental conditions are not maintained. In another example, the rules can set out the structure for transferring rights, or even transferring possession and ownership of the underlying asset. Also, it will be understood that more sophisticated rules may implement the full functionality of a hardware agent allowing, for example, the hosted secure data object advantageously with one or more child secure data objects, to consummate a financial or legal contractual agreement.

As shown in block 1211, a child secure data object 2 1207, derived from secure data object 1 1205, may be transferred to a host computer system or in some cases to a hardware agent. The host or hardware agent uses the child secure data object 2 1207 according to its allowed permissions and permissible rules to effect commercial transactions. Responsive to applying the rules and effecting the commercial transaction, the host or hardware agent may create another child secure data object 4 1213. In this case, the parent of child secure data object 4 1213, is secure data object 2 1207, itself the child secure data object of secure data object 1 1205. This secure data object 4 1213 may contain more or less data than contained in the original secure data object 2 1207, as the host or hardware agent operates according to its permissions or permission level which determine or form the new secure data object 4 1213. In some cases, the secure data object 2 1207 may have certain of the permissions, rules, and rights that must be part of the new secure data object 4 1213, and may have other permissions, rights, and rules that the host or hardware is able to decide whether or not to include them, or to include them in a modified way. The secure data object 4 1213 may be transferred to another host or hardware agent as shown in block 1217.

In this example, block 1217 represents a host or hardware agent that has sufficient permission to consummate a commercial transaction, and when the host or hardware agent applies the rules, determines that the commercial transaction may be appropriately consummated. In making that decision, the host or hardware agent 1217 receives secure data object 4 1213, which, for example, may show the historical progress of the data object or an associate asset as it's moved through a custodial chain.

In this example, another child of secure data object 1 1205 is also created, secure data object 3 1221, that has a subset of the available rights, permissions, and rules of the secure data object 1 1205. In particular, the secure data object 3 1221 has only the information that would be necessary for a trusted third-party 1225 to assist in managing a commercial transaction. Such an entity 1225 may be an escrow company, an insurance company, or some other type of secure reporting or data construct, such as a blockchain.

In order to consummate the transaction, the host or hardware agent 1217 may contact the trusted entity 1225 to obtain confirmation that the transaction is allowable. In some cases, this may be accomplished through the transfer of yet another secure data object or data object, or it may be through a cloud or distributed service such as a blockchain. Either way, host or hardware agent 1217 consummates the transaction, and then creates further secure data objects for reconciling 5 1229 the transaction or reporting the transaction 6 1231. For example, the completed transaction may be reported back to the stakeholders, the trusted escrow account, or may be published as a blockchain or other data construct. Again, the particular permissions, rules, and rights that are contained in secure data objects 5 1229 and 6 1231 are determined by the permissions granted to the host or hardware agent to effect commercial transaction 1217.

In one example of using information system 1200, a stakeholder may own a case of wine, which is a valuable asset. The stakeholder creates a secure data object that sets out the allowable distribution and shipping chain for the case of wine, the limits to the temperature and vibration that the wine can undergo, and the rules regarding how much the case of wine should be sold for under different conditions, e.g. monitored temperature or vibration. The stakeholder, or a party acting on their behalf, then loads the secure data object into a hardware agent configured as a tag that is attached to the case of wine, and the case of wine is delivered to the first shipper. As the case of wine moves to the distribution channel, the hardware agent monitors the environmental condition for temperature and vibration. It will be understood that many types of environmental conditions could be monitored. When the case of wine is delivered to a potential consumer, the potential customer interacts with the hardware agent to propose purchasing the wine. The potential purchaser may contact a trusted third-party to confirm that the case of wine is authentic, and was actually provided by the listed winemaker. Further, the potential buyer can use the information in the secure data object hosted by the hardware agent to confirm that the wine was properly shipped. If the wine was not properly shipped, the hardware agent would understand the rules it could apply to offer a discount to the purchaser. However, provided the wine was properly handled, the purchaser could continue to consummate the transaction with the hardware agent, and the hardware agent would transfer ownership and title of the case of wine to the purchaser concurrently with the transfer of payment. Upon completing the transaction, the hardware agent could report the transaction back to the escrow holder, an insurance carrier, the shipper, or someone else having an interest in knowing that the transaction had been completed. The reporting and reconciling could be done using a data object transferred directly to another host, or could be through publishing to a cloud system such as a blockchain.

Figure 13:
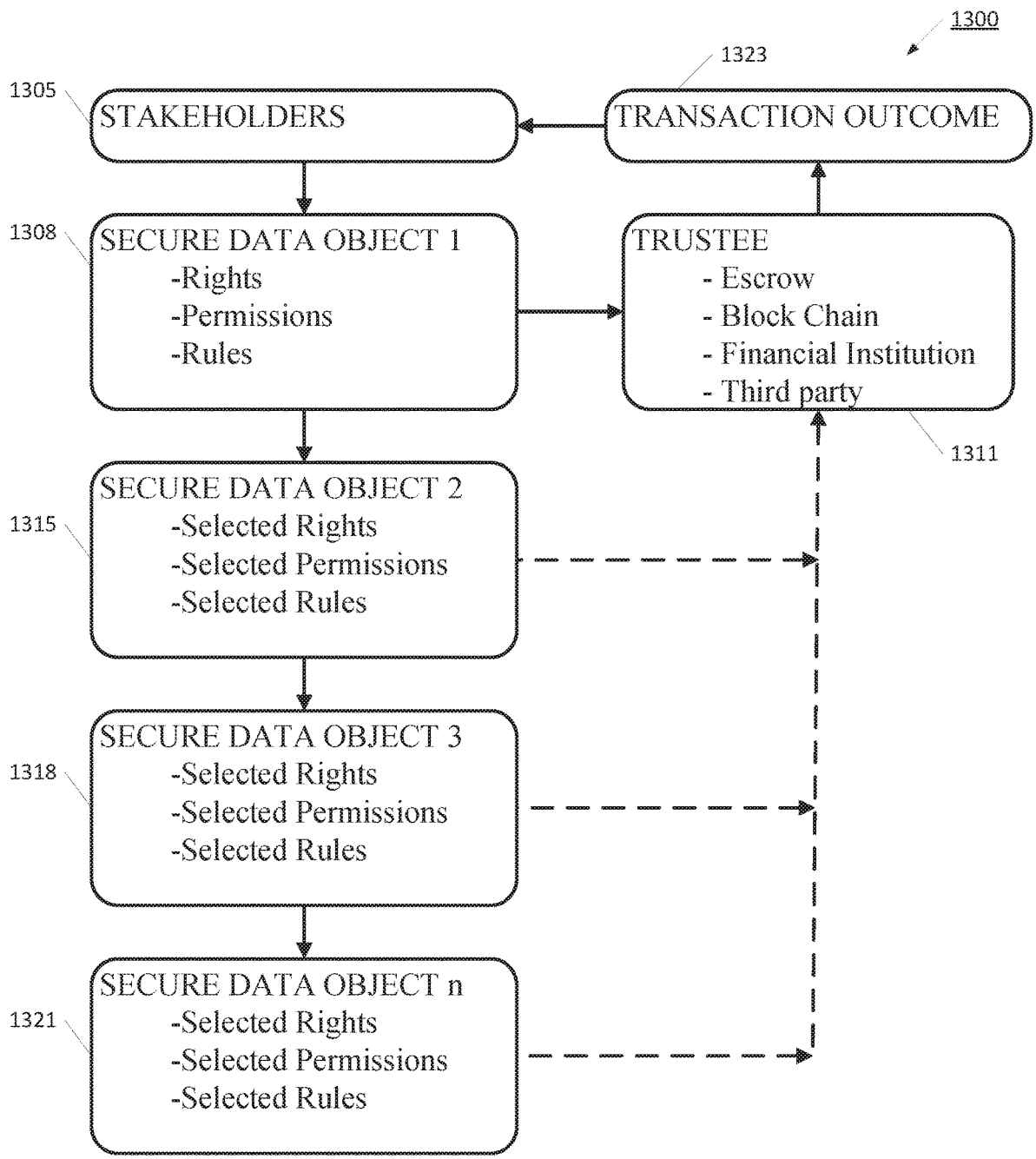
FIG. 13 is a block diagram of an information system using secure data objects according to the present invention.

Referring now to FIG. 13, another information system 1300 is illustrated. The information system 1300 again has one or more stakeholders 1305, which create a secure data object 1 1308. That secure data object 1 1308 then moves through a chain of custody, where various hosts or hardware agents are able to use the secure data object 1 1308 according to their specific permissions. For example, the secure data object 1 1308 which has the base permissions, base rights and base rules, can be sent to multiple hosts or hardware agents, each of which applies the available rules and effects rights as permitted. Accordingly, the secure data object's permissions, rules and rights and other information may be modified for further communication down the chain of custody. In each instance, the secure data object may accordingly be modified before it is transferred from one host or hardware agent to another. In that way, each instance of the secure data object 1 1308, shown in blocks 1315, 1318 and 1321, reflect changes or modifications effected by their current host or hardware agent to the previous instance of the secure data object. For example, secure data object 3 1318 reflects changes and modifications to secure data object 2 1315, the previous instance of secure data object.

Secure data object 2 1315, in its turn, reflected changes or modifications to secure data object 1 1308.

Depending on the permissions set in the initial secure data object 1 1308, some information may be mandatory, permanent or immutable in each instance of the secure data object as it move through the entire chain, whereas some instances of the secure data object may contain a subset of the original rights, permissions and rules. Further, additional modifications may be made to those rights, rules, and permissions as allowable. At each point along the chain of custody, the secure data object may be sent to the next host or hardware agent in the chain of custody. Alternatively, a copy of the current instance of a secure data object may be transferred to another host or hardware agent. In one example, an instance of secure data object, a successor to a previous instance of the secure data object may be communicated back to a trustee 1311 that can monitor the overall transaction. The trustee 1311 may be an escrow company, a financial institution, any 3rd party with an interest in the outcome, or it could be a distributed data construct or ledger such as a blockchain. Once the transaction has been completed, the trustee 1311 can then report the transaction outcome 1323 back to the stakeholders, or to others that may have an interest in the transaction outcome.

Figure 14A:
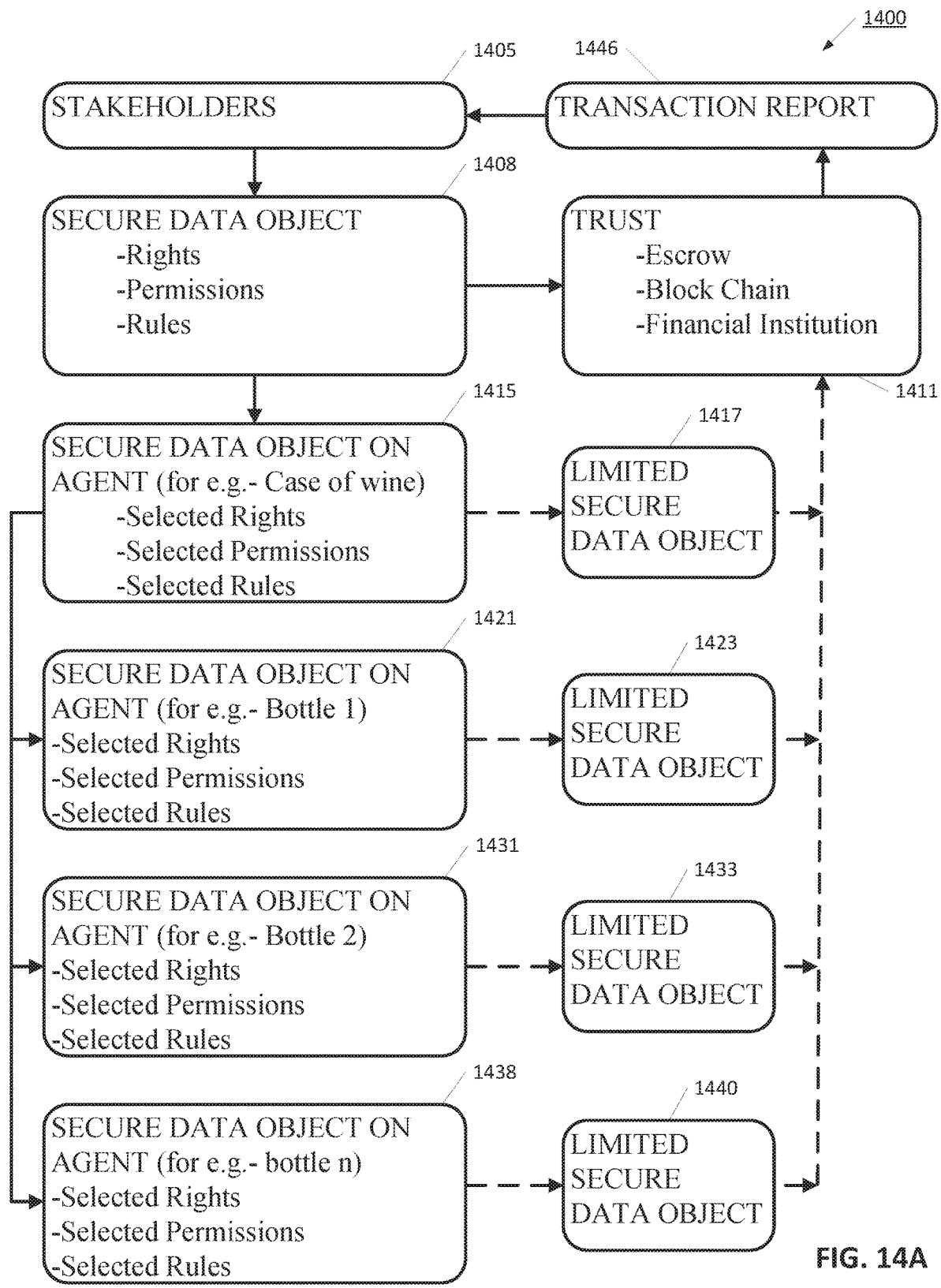
FIG. 14A is a block diagram of an information system using secure data objects according to the present invention, including a specific example of using the information system to track a case of wine and its bottles.

Referring now to FIG. 14A, another information system 1400 is illustrated. As previously discussed, information system 1400 begins with one or more stakeholders 1405 that create a secure data object 1408 that contains rights, permissions, and rules for some asset. In one example, the asset may be a physical good, such as a case of wine. It will be understood that the physical good may take many forms. It will also be understood that the good may be something such as a gift card or stored value card or other transportable financial instrument. According to the interests of the stakeholders 1405 the secure data object 1408 is typically created and hosted on a first host computer system. A hardware agent configured agent configured as a tag, label, packaging or product etc., such as those described with reference to FIGS. 1 through 7, may be used, and attached to, associated with or embedded within a physical asset. According to the permissions set by stakeholders 1405, the secure data object 1408 is transferred to another host or in this example, a hardware agent as shown in block 1415. This secure data object on agent 1415 may contain all the rights, permissions, and rules as set out in the initial secure data object 1408, or may contain a greater or more limited subset. Secure data object on agent 1415 therefore may be equivalent to the secure data object 1408 or it may be a child of the initial secure data object 1408. In either case, the hardware agent will access the permissions it has received, and determine what rules it may operate, and which rights it may effect.

The hardware agent hosting the secure data object 1415 may apply the rules it has permission to run, and accordingly may be able to modify or effect selected rights. Often, the hardware agent hosting secure data object 1415 will create some limited secure data object 1417 that is communicated back to the stakeholders 1405, or oftentimes to a trusted third-party 1411, such as an escrow, financial institution, or even a cloud-based blockchain. In such a case, the trusteed entity 1411 then communicates a transaction report 1446 back to the stakeholders 1405. A limited secure data object for example, might limit permissions to only data access and transfer of the secure data object, but not the modification of the permissions, rights or rules. In this way, the hardware agent is able to report its activity as the asset moves through the chain of distribution. In some, but not all cases, the hardware agent with secure data object on agent 1415 may remain attached or associated with a specific physical good. As the hardware agent moves through the chain of commerce, different rights, permissions, and rules may be activated depending upon who has physical custody of the asset, or according to some local condition.

In another example, the hardware agent may receive an external signal that causes rules, rights, or permissions to be modified or acted upon in a different way. Thus, the secure data object may adapt to the changing environment, or to changes in the interests and intents of the stakeholders or of the escrow agent or finance company. In such a case, the hardware agent may modify the initial secure data object 1408, according to its permissions, rules and rights, as it moves through the chain of commerce, creating multiple instances of initial secure data object 1408 as shown in blocks 1421, 1431, and 1438. Exemplary modifications and resulting generation of successive instances of the secure data object may depend on changes in the location of the physical asset, changes in its environment or other monitored condition, changes in custody, actual or elapsed time, changes initiated by a stakeholder to the asset, etc.

In another example, a hardware agent may be enabled by permissions to pass a secure data object to one or more hardware agent tags. For example, an initial secure data object 1408 could be transferred to a hardware agent configured as a tag and attached to a case of wine, as shown in block 1415. Further, for example when the case was opened, child secure data objects as shown in blocks 1421, 1431 and 1438, of secure data object on agent 1415 could be transferred or broadcast to hardware agent tags attached to individual bottles of wine within the case. And further, at the time of sale for example, each bottle-level hardware agent tag could generate according to the selected rules, permissions and rights of its secure data object, limited secure data objects as shown in blocks 1423, 1433 and 1440. These limited data objects could contain for example, inherited data about the history of the case of wine and locally generated information related to the individual bottle such as seller, sales date etc. and be transferred to stakeholders, other parties or blockchains or other data constructs. In this way, the stakeholders maintain ultimate control of the asset throughout the distribution channel. For example, the stakeholders would have authorized secure data object on agent 1415 to have the permission to break the case into individual bottles, as long as sufficient permissions, rights, and rules were transferred to the individual bottles' hardware tag or agent.

In a similar manner, the information system 1400 would work effectively in allowing a financial instrument to be transferred among a chain of entities or people. In this way, a first hardware agent would control a larger amount of money, and then individual secure data objects would receive portions of that money and then be enabled to move through a chain of commerce. Importantly, even though the initial aggregate asset was broken into smaller portions, each of those portions still maintains the required rules, rights, and permissions as set by the stakeholders, and a known reconciling and reporting structure is maintained. For this latter example, a blockchain reporting may be advantageously used.

Figure 14B:
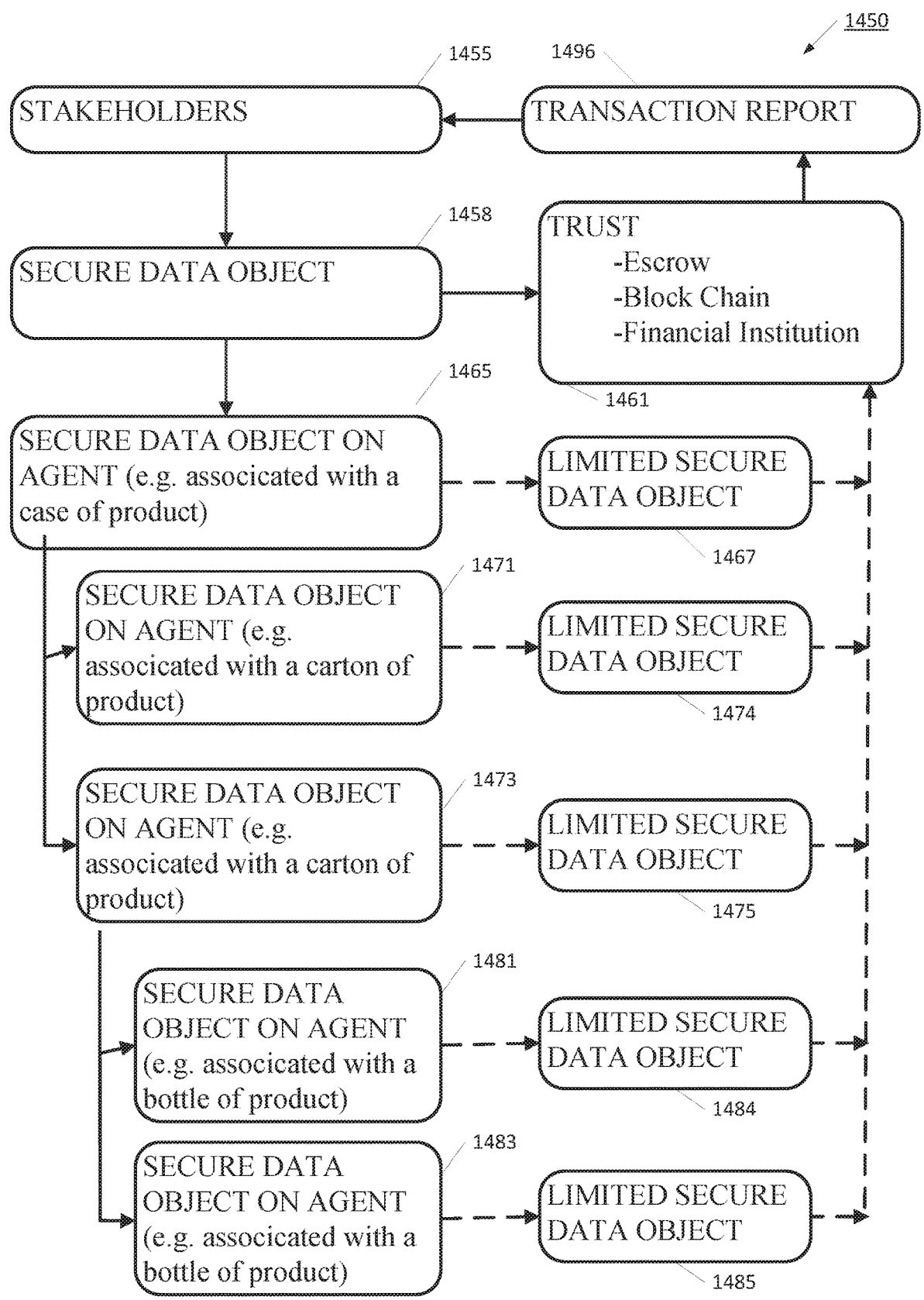
FIG. 14B is a block diagram of an information system using secure data objects according to the present invention, including a specific example of using the information system to track a case that contains cartons that contain bottles.

Referring now to FIG. 14B, another information system 1450 is illustrated. Information system 1450 again has a set of stakeholders 1455 that create an initial secure data object 1458 that contains permissions, rules, and rights for some asset. In one example, the asset is a case of pharmaceuticals containing cartons of pill bottles. It will be understood that the physical asset may take many forms. According to the interests of the stakeholders 1455 the secure data object 1458 is typically created and hosted on a first host computer system, as shown in block 1458. According to the permissions set by stakeholders 1455, the secure data object 1458 is transferred to another host or in this example, a hardware agent, as shown in block 1465. This secure data object on agent 1465 may contain all the rights, permissions, and rules as set out in secure data object 1458, or may contain a greater or more limited subset. Secure data object on agent 1465 therefore may be equivalent to secure data object 1458 or it may be a child of secure data object 1458. In either case, the hardware agent will access the permissions it has received, and determine what rules it may operate, and which rights it may effect.

The hardware agent hosting the secure data object on agent 1465 may apply the rules it has permission to run, and accordingly may be able to modify or effect selected rights. In this example, the hardware agent hosting secure data object on agent 1465 may create and transfer or broadcast multiple child secure data objects to a corresponding number of hardware agents as shown in blocks 1471 and 1473. In this example, each child secure data object has the same selected rights, permissions and rules and other information inherited from their parent secure data object on agent 1465. Each may also inherit some or all of the parent's history. Further, child secure data object on agents 1471, 1473 according to their selected rights, permissions and rules, could in turn, determine or form successor child objects as shown in blocks 1481 and 1483. Each having selected rights, permissions and rules that could be the same or different from their respective parent secure data objects. And further, hardware agents hosting secure data objects, illustrated by secure data object on agents 1465, 1471, 1473, 1481 and 1483 could create and transfer limited secure data objects, illustrated by limited secure data objects 1467, 1474, 1475, 1484, and 1485 respectively. Each limited secure data object would have limited rights, permissions and rules, such as those required to communicate back to the stakeholders 1455 or to a trusted third-party 1461 such as an escrow agent, financial institution, or even a cloud-based blockchain, or effect transactions. In some cases, the trusted entity 1461 may communicate a transaction report 1496 back to the stakeholders. It will be appreciated other reporting mechanisms may be used.

By way of further example, the first hardware agent may be enabled by permissions to pass the initial secure data object or its derivative to a second hardware agent, and the second hardware agent in turn, to pass derivatives of the successor to the initial secure data object to other hardware agents and so on. For example, the secure data object 1458 may be transferred to a first hardware agent configured as a tag attached to a case of pharmaceuticals, as shown in FIG. 1465. A derivative of secure data object on agent 1465, with information regarding that case of pharmaceuticals including its history, may be subsequently transferred to multiple hardware agent tags singularly attached to individual cartons when the case is opened; as shown in blocks 1471 and 1473. In this way, the individual cartons would inherit the history of the case of pharmaceuticals, and would receive permissions, rules and rights appropriate to the individual cartons and their successor hosts. Further, when the cartons are opened, likely at different destinations and having different histories (e.g. exposure to different environmental conditions, custodians etc., derivatives, children of secure data object on agent 1473 could be transferred singularly to hardware agent labels attached to individual pill bottles. Each would have its own selected rights, permissions and rules and the inherited experience of the carton and the case. And, each secure data object could acquire its own history. Lastly, any or all of the secure data objects may generate limited secure data objects to facilitate reporting to, and enable transactions by, stakeholders 1455 and other parties 1451. In this way, the stakeholders maintain ultimate control of the asset throughout the chain of custody.

Figure 15:
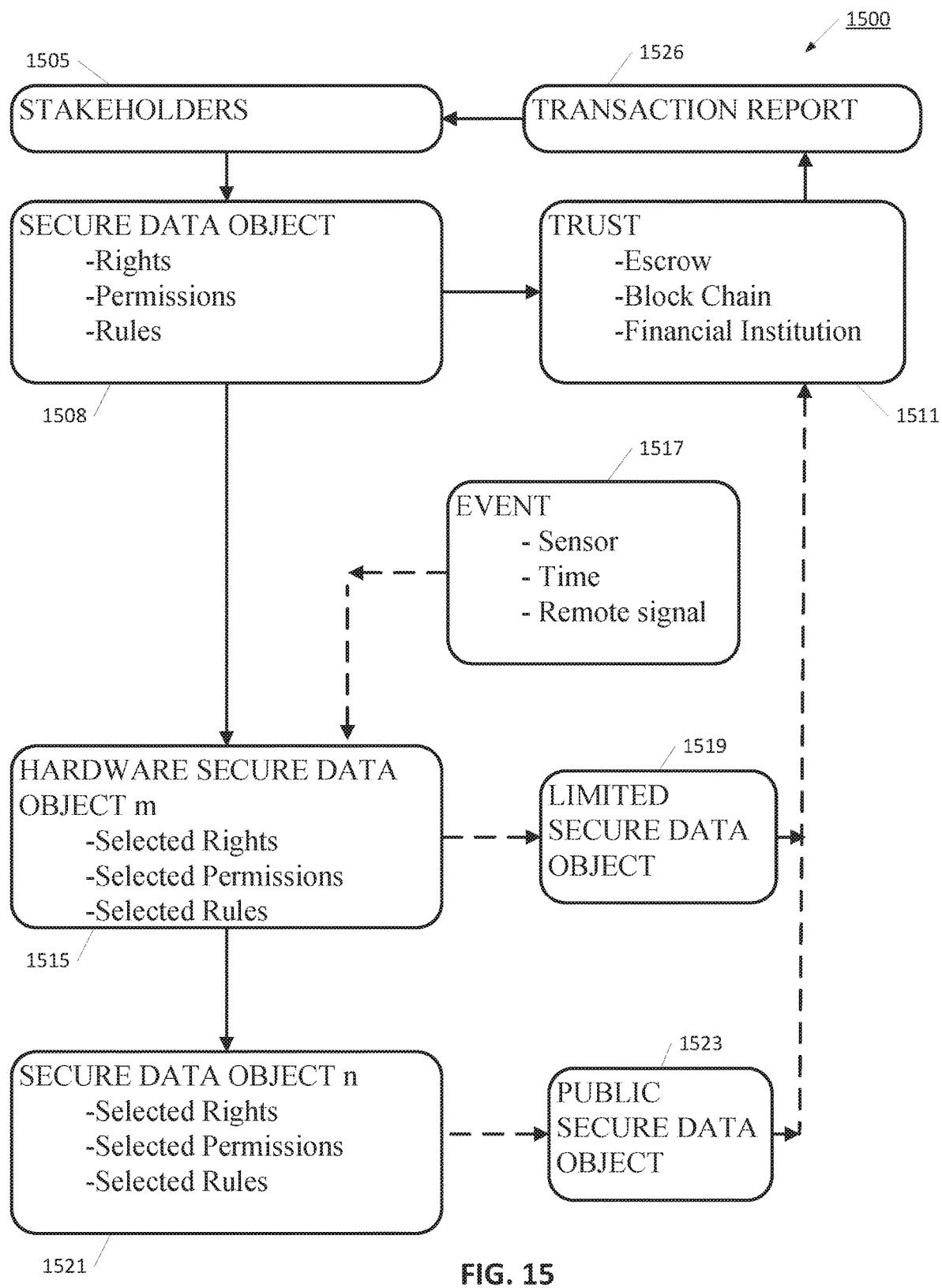
FIG. 15 is a block diagram of an information system using secure data objects according to the present invention.

Referring now to FIG. 15, another information system 1500 is illustrated. Information system 1500 again has a set of stakeholders 1505 that create an initial secure data object 1508 that contains permissions, rules, and rights. Information regarding the secure data object 1508 may be transferred to a trustee 1511, such as an escrow company, financial institution, and blockchain. The secure data object 1508, or a derivative secure data object 1508, may be sent to a hardware agent, as shown in block 1515. The secure data object on hardware 1515 may be the entire original secure data object 1508 or a secure data object with a limited set of the rights, permissions, and rules. Typically, the secure data object will be associated with some physical transportable asset, such as a case of wine or a gift card. If the hardware agent hosting the secure data object is associated, for example, with a perishable good or medicine, the hardware agent may be configured as a tag or label or packaging and may include a variety of event devices 1517 such as a sensor, an internal or external monitor, a clock or timer, a receiver for receiving a remote signal from another hardware agent or host or from a network source, error detection or verification circuitry etc.

In operation, the hardware agent, provided it has the sufficient permissions, will operate rules that enable capture of an event 1517. Again, if it has sufficient permissions, the hardware agent may then effect rules on how to react according to that event. For example, some events may cause the hardware agent with secure data object 1515 to lower the price of the asset, set off an alarm, or create a limited data object 1519 to report the event back to the trustee 1511 or the stakeholders 1505. In one particular example, the secure data object 1515 may create and transfer a derivative secure data object that has a narrow set of rights, permissions and rules, as shown in block 1521. Such a secure data object "n" 1521 may be useful, in particular in reporting and reconciling, to enable information to be distributed, without risking exposure of the full set of rights, permissions contained within it. In some cases, the secure data object "n" 1521 may be a public data object containing information that can be viewed or accessed by anyone. In such a way, secure information may still be held by the secure data object "m" 1515 while sufficient information regarding a public transaction for example, may be put into a limited data object 1523 such that that information can be publicly disclosed through a blockchain, or to an escrow, or to a financial institution. Further, by way of example, once the trustee has confirmed the transaction is complete, it could generate a transaction report 1526, which can be reported back to the stakeholders 1505.

Figure 16:
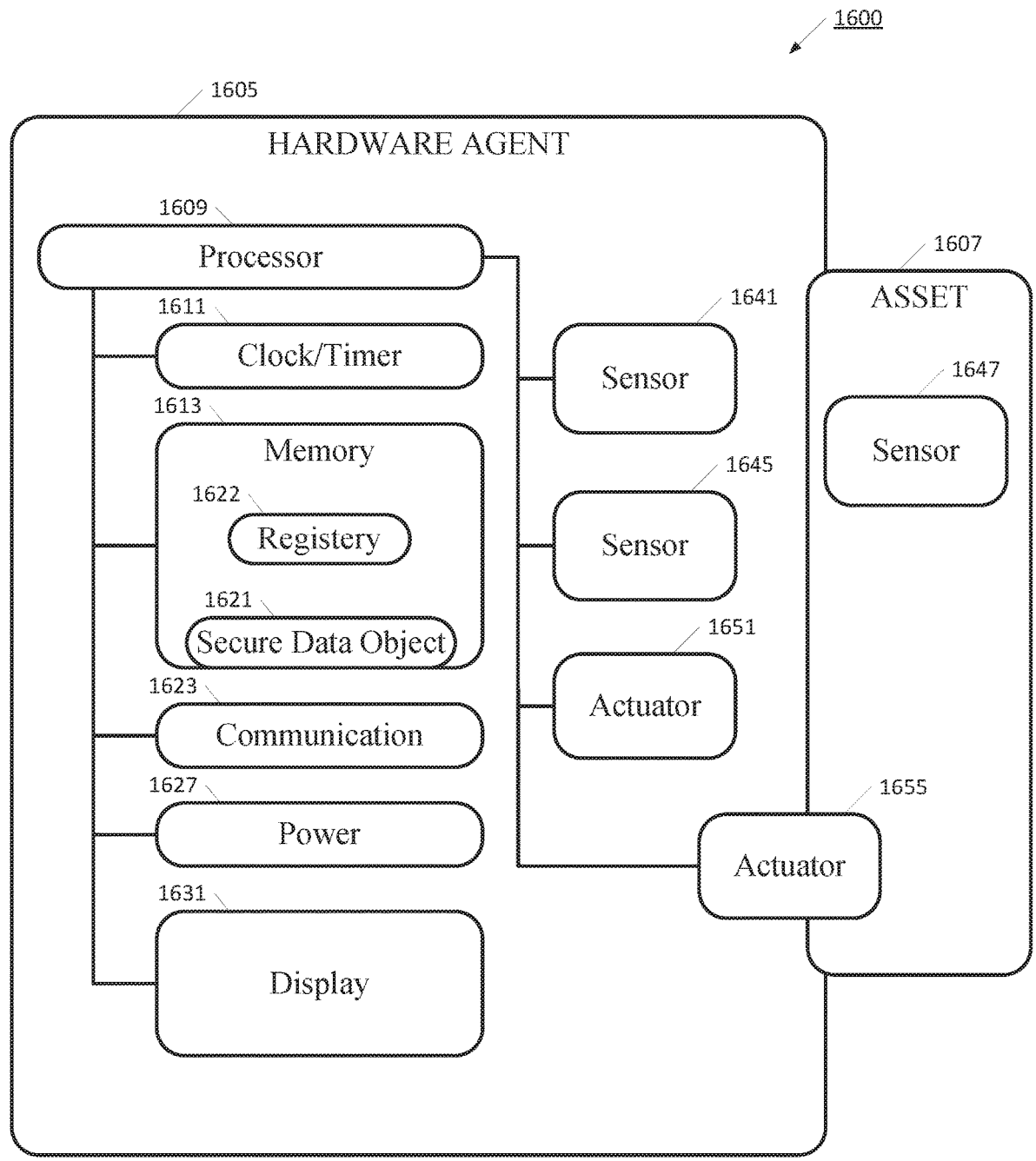
FIG. 16 is a block diagram of a hardware agent for use with an information system using secure data objects according to the present invention.

Referring now to FIG. 16, a hardware agent 1600 is illustrated for use with an information system. It will be appreciated that hardware agent 1600 is only one of many forms that a hardware agent may take and remain functional within the described information system. Generally, the hardware agent 1600 will comprise a physical structure 1605, such as a substrate, card, circuit board, label or tag, or free-standing device. It will be appreciated that the hardware agent may be embodied in many different physical structures consistent with this disclosure, such as being integrally formed into or embedded in product packaging or a product attached to the outside of a package or product, embedded or attached to a gift card, or be part of a mobile memory device. Hardware agent 1605 may be formed as a rigid, semi-rigid or flexible structure.

The hardware agent 1600 will have a processor 1609. The processor may be, a typical computer microprocessor, or may be formed from discrete logical components. The processor will cooperate with several components, which may be integrally formed to the processor, or may be separately provided. For example, the processor 1609 may have a clock 1611 for providing an absolute time, or a timer for providing an elapsed time. The clock or timer 1611 may be used to interrupt the processor 1609 for providing information and actions that the hardware agent 1600 will perform. The processor 1609 also has a memory 1613 for holding information for use by the processor 1609. The memory 1613 is also where one or more secure data objects 1621 can be maintained. The memory may also hold one or more registries 1622, as fully described with reference to FIGS. 1 to 7. It will be appreciated that multiple memories may be used, for example, one memory for containing volatile information for use by processor 1609, and another nonvolatile more secure memory for holding secure data objects, such as secure data object 1621.

The hardware agent 1600 may also have a communication circuit 1623. The communication circuit 1623, may take many forms, such as a physical hardware port for another device to physically plug-in, or may be a wireless communication system such as an RFID, NFC, Bluetooth, WiFi or cellular radio. In other examples, the communication circuit 1623, may comply with one of the international radio standards, such as 802.11. In other examples, the wireless communication may be acoustic or optical. It will be appreciated that the communication circuit 1623 may take many forms. Further, the communication circuit 1623 may be structured to provide communication to host computers, other hardware agents, or to web-based or cloud-based systems.

The hardware agent may also have a power source 1627, which may be, for example, a battery or capacitor, a solar panel or other optical harvester, an RF energy harvester, or a mechanical device for converting mechanical energy to power. It will be appreciated that any type of power source may be used. Also, the hardware agent 1600 may contain a visual interface 1631 or an audible interface. The visual interface 1631 may be, for example, a display that can be permanently and irreversibly set by the hardware agent according to rules and conditions that it applies. In other cases, the display 1631 may be bistable such as an electrophoretic display, or it may be an OLED or a more traditional LED or LCD display.

The hardware agent 1600 may also have a sensor 1641. The sensor 1641 may be, for example, an environmental sensor that can sense conditions such as temperature, vibration, humidity, chemical composition, biologics, shock, radiation, light, liquids, gases or vapors. It will be appreciated that other types of environmental sensors may be used. The sensor 1641 may also sense additional, typically internal conditions such as electrical test and verification signals, and may have monitoring circuitry. Also, although the hardware agent 1600 has its own clock or timer 1611, the sensor may also include timing circuitry. Further, the sensor 1641 may include receiving signals from another host, and other hardware agent, or the asset 1607 that may be attached to the hardware agent. In some cases, the hardware agent 1600 may have a second sensor 1645. In this way, the hardware agent is able to monitor and react to multiple types of environmental conditions, signals, or interactions. In some cases, the hardware agent 1600 may have an actuator 1651. The actuator 1651 may be used to permit the hardware agent 1600 to remain in a low power state until certain conditions are met. For example, the actuator 1651 may be constructed such that power is not supplied to the processor 1609 until, for example, a physical tab has been pulled on the hardware agent 1600. It will be appreciated that many types of physical, electrical and communication stimulation may be used to activate the actuator 1651. In some cases, the actuator 1651 may be part of the hardware agent 1600. In other cases, the actuator 1655 may be remote to the hardware agent 1600 and communicate the actuator signal back to the hardware agent.

As illustrated, the hardware agent 1600 typically is attached to, or otherwise held proximate to an asset 1607. This asset 1607 may be, for example, a physical good, packaging for a good, a gift card, a financial instrument, or other type of valuable asset. In some cases, the asset 1607 may have an actuator 1655 that would be used to transition the hardware agent 1600 from an off or low-power state to a operational state when the hardware agent 1600 is physically attached to the asset 1607. In other cases, the actuator 1655 may be activated according to some other type of outside stimulation, for example, receiving a signal that the asset 1607 is located at or near a particular shipping dock, warehouse, cabinet, shelf, vehicle, livestock or other item. It will be appreciated that many conditions may be used to activate the actuator 1655. As described previously, sensors may be provided on the hardware agent substrate 1605. In another example, the asset itself 1607 may have one or more sensors 1647 that communicate back to the hardware agent 1600. This would be useful, for example, if the sensor is placed inside product packaging. Accordingly, a more accurate profile of environmental or other external or internal conditions may be obtained that show how the actual asset inside the package is being handled.

Figure 17:
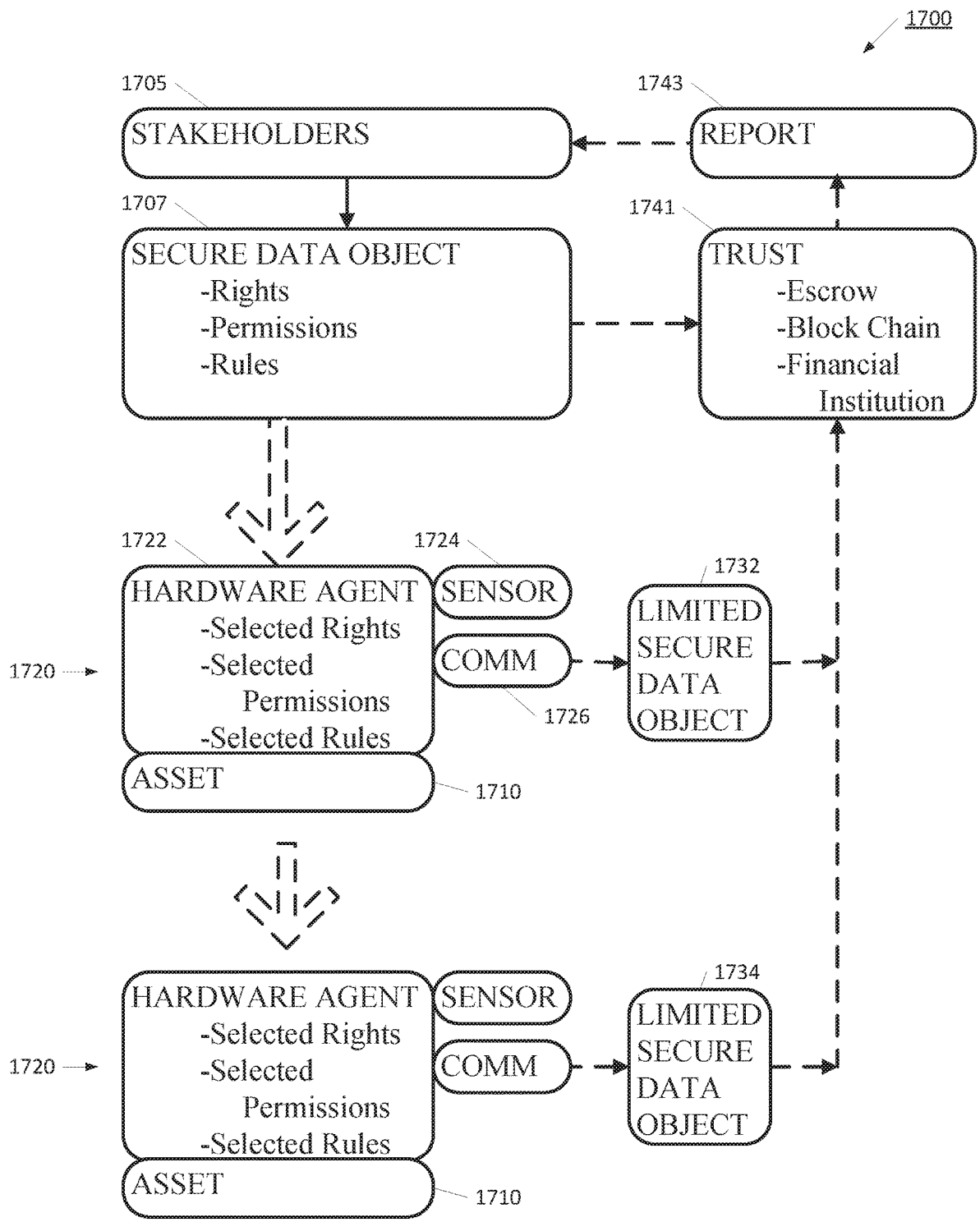
FIG. 17 is a block diagram of an information system using secure data objects according to the present invention.

Referring now to FIG. 17, another information system 1700 is illustrated. Information system 1700 is useful for assets having a hardware agent, such as the hardware agent described with reference to FIG. 16. For information system 1700, one or more stakeholders 1705 define a secure data object 1707 that sets out the full set of rights, permissions, and rules that apply to a particular asset or class of assets. That secure data object, either in its original form, or with only selected rights, permissions, and rules, is transferred into a hardware agent 1722. That hardware agent 1722 is attached to an asset 1710. As described previously, the hardware agent 1722 may have one or more sensors 1724, and one or more circuits for providing external communication 1726. The hardware agent and asset 1720 are connected and are able to be moved, shipped, or used together. In a practical example, the agent and asset 1720 move through a distribution chain, and at various times the agent and asset 1720 are able to communicate with a monitoring computer system.

For example, each time the agent and asset pass through a different shipper, each respective shipper's computer system would be able to retrieve information from the hardware agent 1722, as well as send information to it. Provided the hardware agent 1722 has sufficient permissions, the hardware agent 1722 may be able to generate and communicate a limited secure data object 1732 on the shipper's communication system. This limited secure data object 1732 may then be communicated back to a trusted entity 1741, such as an escrow company, blockchain, or financial institution, so stakeholders and those interested in the transaction may receive periodic updates as the hardware agent and asset 1720 move through the distribution chain. As illustrated, the hardware agent may move to a new location, and then the hardware agent and asset 1720 may be able to generate another limited secure data object 1734, according to the permissions that apply at that location. Again, that limited secure data object may be reported back to a trust entity 1741. Also, it will be appreciated that the hardware agent 1722 may be monitoring its sensors 1724, as the hardware agent and asset 1720 move through the distribution chain. Accordingly, when the limited secure data objects are generated and communicated, they may contain information regarding the environmental condition that the asset 1710 has been subjected to. Also, as previously described, information from the sensor may be used by the hardware agent, provided it has sufficient permissions, to adjust the available commercial transactions for the asset 1710. The information regarding the shipping conditions and commercial transactions may communicated by the limited secure data objects 1732, 1734 to the trustee 1741, who in turn my publish the information, or may send a report 1743 to the stakeholders 1705.

For example, if the asset 1710 is a case of wine, and the hardware agent has detected using its sensors 1724, that the wine has been subjected to temperatures in excess of set thresholds, the hardware agent may be able to offer downstream customers a prorated discount on the value of the wine. Of course, this information may be used by the hardware agent to generate a limited secure data object to send back to the trusted entity 1741 so everyone knows that a problem has occurred in shipping, and that everyone should expect that the value of the asset 1710 has been reduced. In another example, the hardware agent and asset 1720, may determine that based on the actual environment the asset 1710 was subjected to, that the asset is no longer commercially saleable, and must be returned or destroyed. Accordingly, the hardware agent would communicate that information through a limited secure data object to the trusted entity, as well as to reroute the asset 1710 to a predefined return or disposal location.

Once the hardware agent has completed a commercial transaction regarding the asset 1710, or has determined that the asset 1710 must be destroyed or returned, then the hardware agent can prepare a final limited secure data object for transmission back to the trusted entity 1741. At this point, the trusted entity 1741 can report 1743 the final transaction, or the results thereof, back to the stakeholders 1705. In this way, the stakeholders 1705 have been able to control the particular manner in which the asset 1710 is moved through commerce, and authorize the hardware agent 1722 to make commercial and shipping decisions according to the stakeholders' interests and intent. Importantly, all this is done with a high degree of control by the stakeholders 1705, and trusts for the trusted entities 1741.

Figure 18:
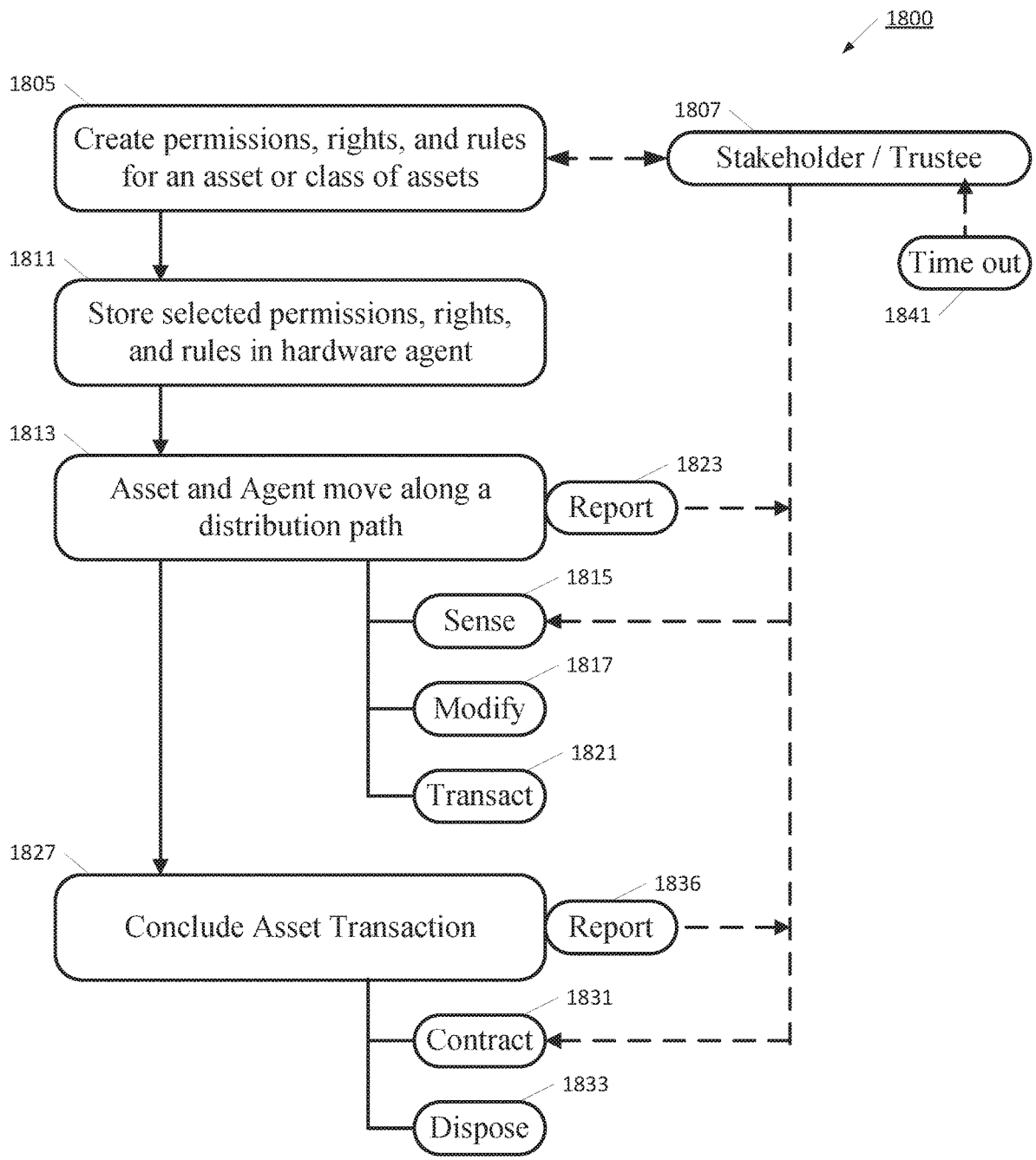
FIG. 18 is a block diagram of an information system using secure data objects according to the present invention.

Referring now to FIG. 18, a method 1800 for using information system is illustrated. In one example, the method 1800 for the information system uses the hardware agent described with reference to FIG. 16. It will be appreciated that other configurations of the hardware agent may be used, for example those described with reference to FIGS. 1 to 7. In method 1800, permissions, rights, and rules are created for an asset or class of assets as illustrated in block 1805. Most often, these permissions, rights, and rules will be set by a party with an interest in the asset or class of assets, such as a stakeholder. The permissions, rights, and rules will be placed into a secure data object. That secure data object may then be moved throughout the distribution chain, either as it originally existed, or as modified by others in the chain of custody, if they have sufficient permissions to do so. The original permissions, rights, and rules, or a selected subset of them, are stored in a hardware agent as shown in block 1811. This hardware agent may be, for example, the hardware agent described with reference to FIG. 16. The hardware agent is then associated or attached to an asset and the asset and hardware agent are moved along the distribution path as shown in block 1813. The hardware agent has a set of permissions, that define what rules and rights the hardware agent is able to access, effect, or change. In some cases, the hardware agent may be able to use an event sensor 1815 to detect conditions for the asset.

As previously described the event sensor 1815 may be an environmental sensor, or may be a timer or clock, or an electrical signal or communication received from a remote entity such as a stakeholder or trustee, etc. Based upon the sensed event, if the hardware agent has sufficient permissions, the hardware agent may act to apply rules or effect rights. In one example, the hardware agent has sufficient permissions to, based on the event, to modify 1817 a rule. In another case, the hardware agent has sufficient permissions to transact business 1821, such as transferring title of the asset to a purchaser. In effect, the hardware agent may have sufficient permissions to use rules and rights to form a legally binding contract, and enact entire legally binding contractual transactions. The hardware agent also will use its permissions to determine what type of report 1823, if any, it may generate as it moves through the distribution path. This report then can be sent to a stakeholder or trusted entity 1807, or possibly even published to a public registry, such as a blockchain.

The asset and hardware agent continue moving along the distribution path and until it concludes the asset transaction as shown in block 1827. In this case, the hardware agent has sufficient permission to conduct and consummate a contract 1831 including transfer of full or partial title in the asset. In another case, the hardware agent may recognize that the asset has been spoiled due to its environmental condition or expiration date, and be able to dispose of the asset 1833. Again, the hardware agent may be able to send a report 1836, depending if it has sufficient permissions. In one specific example, it may be possible that the hardware agent becomes disassociated with the asset, or both the agent and the asset are destroyed or lost. In this case, the stakeholder and trustee 1807 will not receive any reports from the asset and hardware agent. Accordingly, a timeout 1841 may be set that would cause the information system 1800 to treat the asset and hardware agent as being lost or having no value. In a specific example, specific information regarding the asset may be posted into a blockchain or other public registry such that it would be publicly known that the asset, if found, would be unauthorized.

Digital assets, like physical assets, have one or more rights associated with them. These rights may be an individual right, or may be a bundle of rights, such as the right to use the digital asset, to view or display the digital asset, to modify the digital asset, to transfer the digital asset, to make derivative works of the digital asset, to terminate the digital asset or to sell the digital asset.

A decentralized or distributed database or data construct such as a blockchain, may be used for digital assets (e.g. a cryptocurrency, title, contract etc.). A digital asset is typically associated with a physical asset (e.g. title to, a history of, security interest in, or a commercial relationship with, a physical good). In other cases, a digital asset may be independent of a physical asset (e.g. a cryptocurrency) but used in transactions related to one. As with physical assets, digital assets have one or more rights associated with them. And as with secure data objects, data construct permissions determine, for example, who can access, use, modify, or transfer rights to the digital asset and further, who can update the data construct in which a digital asset is maintained. The exercise of those data construct permissions, as in the case of blockchains, may be conditional on 3rd party validation of the data construct permissions and updating of the data construct, e.g. by a community of independent 3rd party validators such as blockchain miners, etc.

It is important to note that although the terms data construct and digital asset are by convention singular, in practice there are typically multiple copies of each that are hosted and managed by 3rd party validators across a decentralized, e.g. peer-to-peer network. Means are employed across the network to ensure consistency of the digital assets, the data constructs, and that successor data construct permissions are in the hands of the appropriate permission holder.

Stated broadly, the rights to a digital asset are exercised with valid data construct permissions, 3rd party validation of those data construct permissions and updating of the data construct for the digital asset. Custody of valid data construct permissions for a digital asset therefore determines who can update the data construct, and in turn, who can exercise the rights to the digital asset. And further, who can transfer data construct permissions. Data construct permissions to digital assets are held by permission holders. Permission holders may or may not have rights to the digital asset other than those associated with the data construct permissions they currently hold. Similarly, permission holders may or may not have rights to the physical asset associated with the digital asset. Permission holders therefore may be either stakeholders or trustees.

Data construct transactions are the way changes are made to the data construct and by extension, the digital assets they encompass. Consummating a data construct transaction always requires data construct permissions and typically 3rd party validation and update of the data construct as previously described. Exemplary data construct transactions include effecting and recording changes in rights, rights holders and permission holders, transaction history, changes in digital assets or other related information, e.g. additions, deletions, modifications to information about the condition or location, custodian or status of a good our commercial transactions. Another exemplary application of a data construct transaction is the effective transfer of data construct permissions from one party, host or hardware agent, to another party, host or hardware agent.

To facilitate commerce, public policy, regulatory oversight and reporting, etc. it may be advantageous for the intent and interests of the stakeholders with rights to digital assets and rights to associated physical goods to be managed in common. Of special interest therefore, are data construct transactions enabled and effected using secure data objects and data construct permissions.

Figure 19:
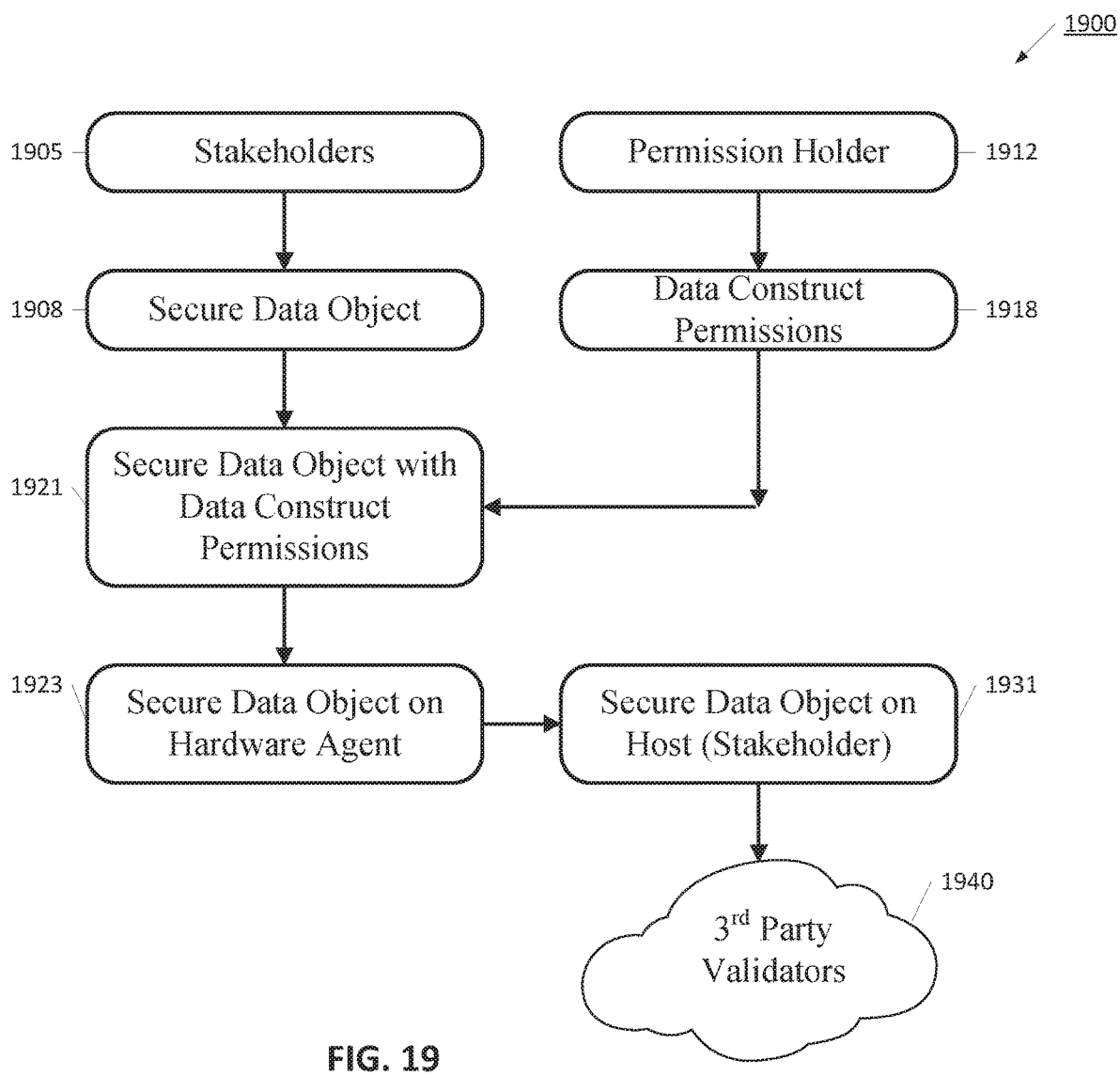
FIG. 19 is a block diagram of an information system using secure data objects for managing digital assets according to the present invention.

Referring now to FIG. 19, an information system 1900 is shown for managing the permissions and rights associated with a physical asset and those of a related digital asset. Information system 1900 includes a permission holder 1912 with custody of a data construct permission 1918 as previously described. Information system 1900 also has stakeholders 1905 that create an initial secure data object 1908 that contains base permissions, base rules, and base rights according to their interests, as previously described. The secure data object 1908 may be formed prior to, concurrently with, or after the data construct permission. Again, according to the base permissions, rules and rights, the secure data object 1908 may receive from the permission holder 1912 the data construct permission 1918 and other information related to the digital asset or data construct, thereby creating secure data object 1921. Advantageously, the secure data object 1921 receives the data construct permission 1918 as part of data construct transaction involving validation and updating of the data construct by 3rd party validators 1931, and whereby the permission holder 1912, and anyone else, is precluded from using a prior instance or copy of the data construct permission 1918 to modify or update the data construct.

Referring again to FIG. 19, the software data object 1921 is transferred to a hardware agent 1923 that operates as previously described according the secure data object's rules, permissions and rights. At some point during the data construct transaction, the hardware agent 1923 makes a determination, according to its secure data object, that it should transfer all or a part of its secure data object 1923 to host 1931, and thereby a stakeholder with control over the host 1931. Again, according to the secure data object's 1923 rules, permissions and rights, stakeholder 1931 effects a data construct transaction using information from the secure data object whereby the data construct permission is validated and the data construct updated by 3rd party validators 1940. Further, notice of a successful validation or successful update of the data construct, is communicated to the stakeholder 1931 who also gains custody of an explicit or implicit successor data construct permission. With this latter action, the stakeholder 1931 becomes in this example the successor permissions holder with control over the rights of the updated data construct and any digital assets within.

Figure 20:
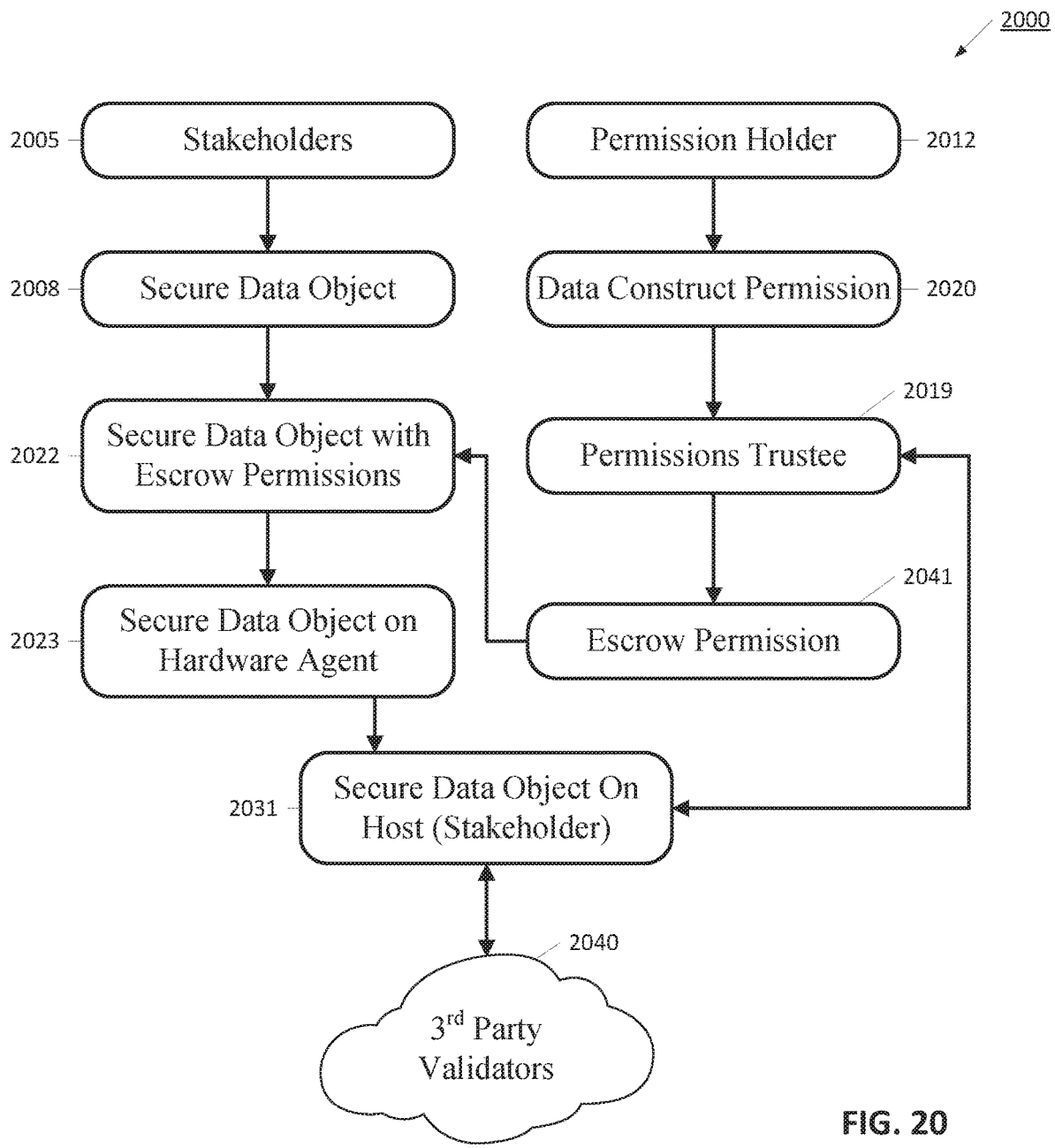
FIG. 20 is a block diagram of an information system using secure data objects for managing digital assets according to the present invention.

A variation of information system 1900, information system 2000, provides for a permissions trustee that escrows the data construct permission and is shown in FIG. 20. Information system 2000 is similar to information system 1900, so only the differences will be described. In this example, the permission holder 2012 effects a data construct transaction with a permissions trustee 2019, where the data construct permission 2020 is validated and the associated data construct is updated by 3rd party validators, and the data construct permission 2020 is transferred to the permissions trustee 2019 along with rules, permissions etc. that determine its use (i.e. using a secure data object). In this way, neither the most recent permission holder, nor anyone other than the trustee 2019, is able to use or transfer the data construct permission 2020, and by extension nor would they able to modify the data construct 2035 (e.g. blockchain), and the permissions trustee 2019 may only do so in accordance with the rules and permissions received from, or agreed to by, the most recent permission holder.

The trustee then generates an escrow permission 2041, where the escrow permission 2041 is associated with the data construct permission 2020. The escrow permission 2041 is set in a secure data object 2008 according to the secure data object's base rights, base permissions and base rules, as shown in secure data object 2021. The secure data object 2021 with the escrow permission is transferred to one or more hosts and hardware agents where it operates as previously described. Again, according to the secure data object's rules and permissions, in this example, a host under the control of a stakeholder 2031 communicates the escrow permission to the permissions trustee 2019. The permissions trustee 2019 uses the escrow permission to identify the associated data construct permission, and transfers it to the stakeholder-host 2031. The stakeholder-host then initiates a data construct transaction as previously described for system 1900. Note there are numerous alternative variations of information system 200 for achieving the same escrow outcome.

The rules and permissions that determine the permission trustee's actions regarding the data construct permissions, would advantageously provide for exceptions, such as no escrow permission has been presented to the permissions trustee 2041 to access the data construct permissions by a set time or date. For example, a situation where the secure data object containing the escrow permissions 2022 or its host or a hardware agent 2023, is tampered, damaged or lost or otherwise delayed or interfered with. In practice, the rules and permissions might automatically revert the data construct permissions back to the previous permissions holder 2012, or transfer them to another, previously determined stakeholder such as an insurer or financier with a security interest in the physical asset.

Figure 21:
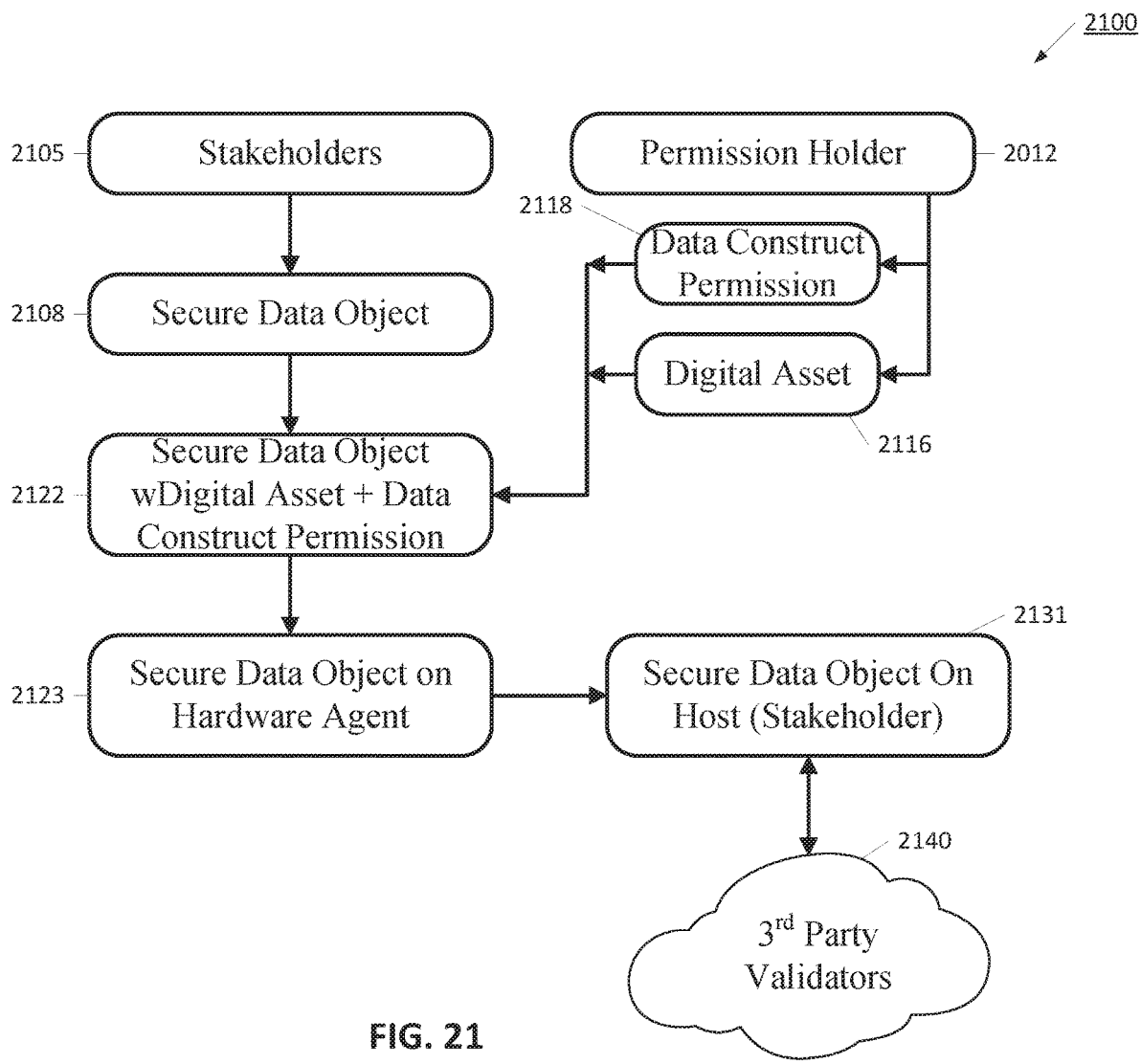
FIG. 21 is a block diagram of an information system using secure data objects for managing digital assets according to the present invention.

Referring now to FIG. 21, an information system 2100 is shown for managing the permissions and rights associated with a physical asset and those of a related digital asset. The stakeholders 2105 and permission holder 2012 are similar to those described with reference to FIG. 19, so will not be described here. Information system 2100 is similar to information system 1900, however it also supports the setting of a copy of a digital asset 2116 maintained by a data construct in a secure data object 2108, according to the secure data object's base rules, base permissions and base rights, along with data construct permission 2118. Advantageously, the preceding actions would be accomplished by a data construct transaction so that the copy of the digital asset in the data construct can't be modified except according to the base rules, base permissions and base rights as they pertain to the data construct permission 2118 in the secure data object 2122.

Referring again to FIG. 21, the secure data object 2122 is transferred to a hardware agent 2123, where information is generated and the digital asset and a new version created. The stakeholder-host 2131 receives the secure data object 2122 with the modified digital asset and the data construct permission, and initiates a transaction according to the secure data object's rules, permissions and rights. The 3rd party validators 2140 validate the data construct permissions and update the data construct by adding the modified digital asset. For example, the digital asset 2116 might be a purchase contract or a payment authorization, where the prices depend upon the condition of a good when it is delivered to stakeholder 2131. According to the secure data object's rules and permissions, and the condition of the goods as monitored by the hardware agent, the purchase contract or payment authorization, or both, would be modified to reflect any adjustments to pricing. The 3rd party validators 2140 would validate the data construct permissions and add the modified purchase contract or payment authorization to the data construct.

Alternatively, the secure data object 2108 could be set with rules and permissions for generating the information required to modify the digital asset 2116. This information would then be used by the 3rd party validators 2140 to update the digital asset maintained by the data construct. For example, to update pricing information in a purchase contract, the digital asset maintained by the data construct.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A hardware agent comprising;
   a processor;
   a memory;
   an event device;
   a communication circuit;
   a power source;
   wherein the hardware agent is constructed to autonomously perform actions according to a current instance of an electronic contract and a current instance of an electronic registry;
   an initial electronic contract that provides rules and conditions which determine actions of the hardware agent that the hardware agent will autonomously enforce;
   an initial electronic registry of a plurality of stakeholders, the initial electronic registry storing each stakeholders' respective rights in the initial electronic contract that the hardware agent will autonomously enforce;
   wherein (1) the initial electronic contract and the initial electronic registry are stored in the memory of the hardware agent as a current instance of an electronic contract and a current instance of an electronic registry, and (2) the current instance of the electronic contract and the current instance of the electronic registry are immutable except by the hardware agent as allowed by the current instance of the electronic registry and the current instance of the electronic contract, and
   wherein the hardware agent is capable of generating and storing a new current instance of the electronic registry or a new current instance of the electronic contract and performing actions according to the new current instance of the electronic contract as allowed by the rights of each of the stakeholders as set out in the new current instance of an electronic registry, and wherein the new current instance of the electronic registry or the new current instance of the electronic contract is generated in compliance with the current instance of the electronic contract and the current instance of the electronic registry.

2. The hardware agent according to claim 1, wherein the plurality of stakeholders comprises a first stakeholder registered in the registry at a first time, and a second stakeholder registered in the registry at a second time.

3. The hardware agent according to claim 2, wherein the second stakeholder is registered at a time after the time the first stakeholder is registered.

4. The hardware agent according to claim 1, wherein the hardware agent registers the stakeholders responsive to receiving registration information from a computer system, a host computer or host system, a hardware device or hardware agent, or a network entity.

5. The hardware agent according to claim 1, wherein the hardware agent is mobile.

6. The hardware agent according to claim 4, wherein the computer system, the host computer or system, the hardware device or hardware agent, or the network source is mobile.

7. The hardware agent according to claim 1, further comprising a (1) visual display or indicator, or (2) a speaker or audible alarm.

8. The hardware agent according to claim 1, wherein the event device is configured to communicate an event signal, and upon receipt of the event signal, the hardware agent performs the actions.

9. The hardware device according to claim 8, wherein the event device is (1) a sensor, (2) an internal or external monitor, (3) a clock or timer, (4) a receiver for receiving a remote signal from another hardware agent, host or network source, (5) error detection circuitry or (6) verification circuitry.

10. The hardware device according to claim 9, wherein the sensor is a temperature sensor, a vibration sensor, a humidity sensor, a shock sensor, a pressure sensor, a strain sensor, a light sensor, an acoustic sensor, a gas sensor, a radiation sensor, a biological sensor, a chemical sensor or a vibration sensor.

11. The hardware agent according to claim 8, wherein the actions include (1) generating a new electronic contract or electronic registry, or (2) adding to, deleting from, or modifying the current instance of the electronic contract or the electronic registry.

12. The hardware agent according to claim 1, wherein the actions include (1) adding to, deleting from or modifying the current instance of the electronic contract or the electronic registry, or (2) generating a new current instance of the electronic contract or electronic registry to be transmitted or broadcast using the communication circuit.

13. The hardware agent according to claim 12, wherein the new current instance of the electronic contract or electronic registry to be transmitted or broadcast, determines the actions of another entity to transmit, use or modify the new current instance of the secure data object.

14. The hardware agent according to claim 12, wherein the actions further include transmitting or broadcasting the new current instance of the electronic contract of electronic registry.

15. The hardware agent according to claim 1, wherein the current instance of the electronic contract or the current instance of the electronic registry enable features to be used on the hardware agent.

16. The hardware agent according to claim 1, wherein the current instance of the electronic contract or the current instance of the electronic registry is permanently updated by performing the action.

17. The hardware agent according to claim 1, wherein the actions include (1) adding to, deleting from or modifying a current instance of a data container or trust, or (2) generating a new data container or trust to be transmitted or broadcast using the communication circuit.

18. The hardware agent according to claim 17, wherein the actions further include transmitting or broadcasting a new current instance of the data container or trust.

19. The hardware agent according to claim 1, wherein the action enables the current instance of the electronic contract or the current instance of the electronic registry to be modified by another entity.

20. The hardware agent according to claim 1, wherein the actions include (1) adding to, deleting from or modifying a current instance of a data structure, distributed ledger or blockchain, or (2) generating a new current instance of a data structure, distributed ledger or blockchain.

21. The hardware agent according to claim 20, wherein the actions further include transmitting or broadcasting a new current instance of a data structure, distributed ledger or blockchain.

22. The hardware agent according to claim 1, wherein the actions include (1) generating an initial instance of a secure data object or limited data object, (2) adding to, deleting from or modifying a current instance of a secure data object or limited data object, or (3) generating a new current instance of a secure data object or limited data object.

23. The hardware agent according to claim 22, wherein the actions further include transmitting or broadcasting a current instance of a secure data object or limited data object.

24. The hardware agent according to claim 22, wherein the actions further include (1) conducting, consummating or modifying a contract or agreement, (2) enacting a transaction, (3) reporting activities, (4) transferring rights in a digital or physical asset, title or ownership, or (5) effecting a payment.

* * * * *